(12) United States Patent
Liu et al.

(10) Patent No.: US 10,353,197 B2
(45) Date of Patent: Jul. 16, 2019

(54) ELECTRONIC DEVICE

(71) Applicant: Lenovo (Beijing) Co., Ltd., Beijing (CN)

(72) Inventors: Junfeng Liu, Beijing (CN); Qicheng Ding, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 154 days.

(21) Appl. No.: 14/755,782

(22) Filed: Jun. 30, 2015

(65) Prior Publication Data
US 2016/0282631 A1    Sep. 29, 2016

(30) Foreign Application Priority Data

Mar. 27, 2015  (CN) .......................... 2015 1 0142080

(51) Int. Cl.
| | |
|---|---|
| *G02B 27/14* | (2006.01) |
| *G02B 27/30* | (2006.01) |
| *G02B 27/00* | (2006.01) |
| *G05F 1/16* | (2006.01) |
| *G06F 1/16* | (2006.01) |
| *G02B 7/00* | (2006.01) |

(52) U.S. Cl.
CPC ......... *G02B 27/0081* (2013.01); *G02B 7/002* (2013.01); *G06F 1/163* (2013.01); *G06F 1/1637* (2013.01)

(58) Field of Classification Search
CPC .... G02B 27/0081; G02B 7/002; G02B 27/01; G02B 27/0101; G02B 2027/0123; G02B 2027/014; G02B 2027/0147; G02B 2027/015; G02B 2027/0152; G06F 1/163; G06F 1/1633; G06F 1/1637; G06F 1/1639; G06F 1/1647

USPC ......................................... 359/613, 660, 633
See application file for complete search history.

(56) References Cited

U.S. PATENT DOCUMENTS

| | | | |
|---|---|---|---|
| 2012/0242560 A1 | 9/2012 | Nakada et al. | |
| 2014/0143678 A1* | 5/2014 | Mistry ................... | G06F 3/017 |
| | | | 715/746 |
| 2015/0193102 A1* | 7/2015 | Lanier ................... | G06F 3/017 |
| | | | 715/746 |

FOREIGN PATENT DOCUMENTS

| | | |
|---|---|---|
| CN | 103209310 A | 7/2013 |
| CN | 203433196 U | 2/2014 |
| CN | 204129444 U | 1/2015 |
| CN | 104375272 A | 2/2015 |
| CN | 104464527 A | 3/2015 |
| CN | 204666959 U | 9/2015 |

OTHER PUBLICATIONS

Office Action, and English language translation thereof, in corresponding Chinese Application No. 201510142080.9, dated Dec. 4, 2017, 15 pages.

* cited by examiner

*Primary Examiner* — Marin Pichler
(74) *Attorney, Agent, or Firm* — Brinks Gilson & Lione; John C. Freeman

(57) ABSTRACT

An electronic device includes a first display unit configured to output a first image, and including a first visible area for allowing first light corresponding to the first image exiting therefrom; a first viewing area having a minimum area value in a first distance away from the first visible area, wherein the minimum area value is a first threshold for perceiving a complete display content of the first image.

9 Claims, 26 Drawing Sheets

ELECTRONIC DEVICE

This application claims priority to Chinese Patent Application No. 201510142080.9 filed on Mar. 27, 2015; the entire contents of which are incorporated herein by reference.

The present application relates to the field of electronic device, and more particularly, to an electronic device and a display method thereof.

BACKGROUND

Currently, a wearable electronic device like a smart watch is often equipped with a display apparatus, since performance of the display apparatus develops constantly, its viewing angle become larger and larger, some may have a viewing angle as high as 170 degrees. The wearable electronic device like a smart watch often displays private content that a user does not want others to see, therefore, such display apparatus may cause a privacy leak of the user.

Therefore, it is desired to provide an electronic device and a display method thereof, which can avoid a leak of the displayed privacy of the user while providing the user with image or video display with a larger size and a higher resolution, thus enhancing associated user experience.

SUMMARY

According to an embodiment of the present application, there is provided an electronic device, comprising: a first display unit configured to output a first image, and the first display unit comprising a first visible area for allowing first light corresponding to the first image exiting therefrom; a first viewing area having a minimum area value in a first distance away from the first visible area, wherein the minimum area value is a first threshold for perceiving a complete display content of the first image.

The electronic device according to an embodiment of the present application can avoid a leak of the displayed privacy of the user while providing the user with image or video display with a larger size and a higher resolution, thus enhancing associated user experience.

It is to be understood that both the foregoing general descriptions and the following detailed descriptions are exemplary and intended to provide further explanation of the claimed technique.

DETAILED DESCRIPTION

Hereinafter, preferred embodiments of the present application will be described in detail with reference to the accompanying drawings.

First, an electronic device according to an embodiment of the present application will be described with reference to FIGS. 1A to 1E. The electronic device according to an embodiment of the present application may be a wearable electronic device like a smart watch. Of course, those skilled in the art will readily appreciate that, the electronic device according to an embodiment of the present application is not limited thereto, instead, it may include any electronic device having a display unit. For the sake of convenience of description, description is provided with the wearable electronic device like a smart watch as example.

Figure 1A:
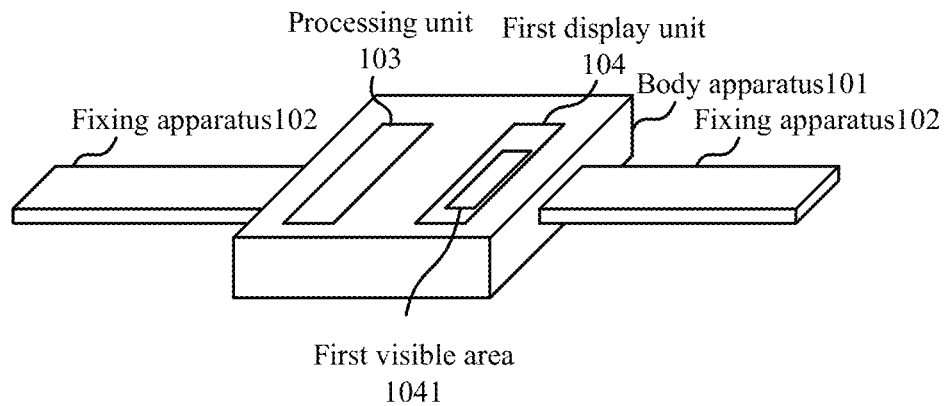
FIGS. 1A to 1E are structural block diagrams illustrating an electronic device according to an embodiment of the present application.

FIGS. 1A to 1E are structural block diagrams illustrating an electronic device according to an embodiment of the present application. As shown in FIG. 1A, an electronic device 100 according to an embodiment of the present application comprises a body apparatus 101 and a fixing apparatus 102. The fixing apparatus 102 is connected with the body apparatus 101 and configured to fix a position relationship relative to a viewer of the electronic device 100. The fixing apparatus 102 includes at least a fixed state in which the fixing apparatus 102 can serve as at least a portion of an annular space or an approximate annular space that satisfies a first predetermined condition, the annular space or the approximate annular space can surround periphery of a columnar body that satisfies a second predetermined condition.

Figure 1B:
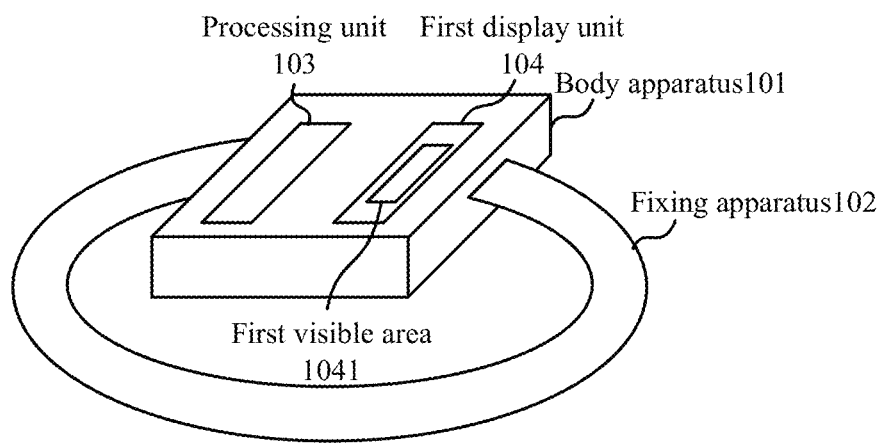
Figure 1C:
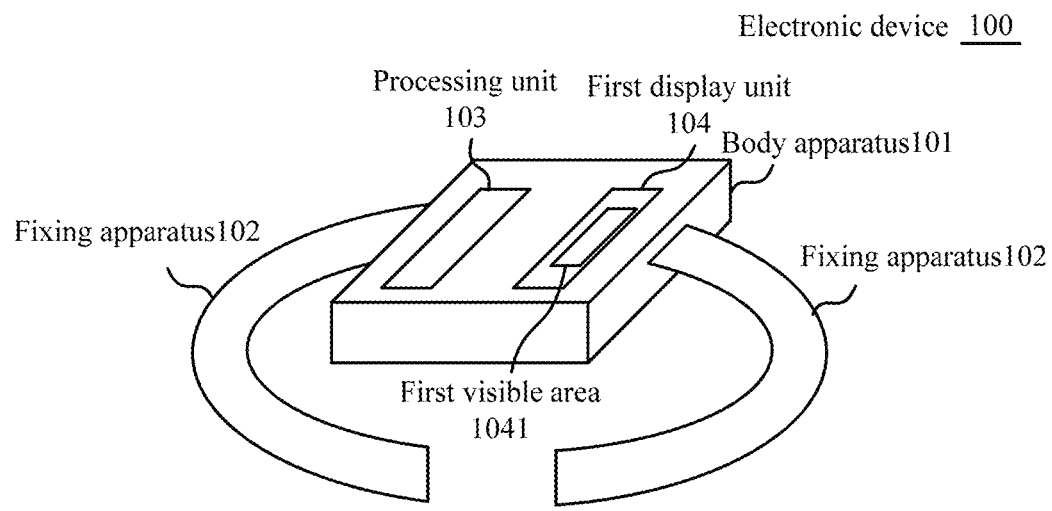

Specifically, FIGS. 1B and 1C respectively illustrate two fixed states that the fixing apparatus 102 is connected with the body apparatus 101. In a first fixed state as shown in FIG. 1B, the fixing apparatus 102 and the body apparatus 101 form a closed annular space, wherein the fixing apparatus 102 and the body apparatus 101 constitute a portion of the annular space, respectively. In a second fixed state as shown in FIG. 1C, the fixing apparatus 102 and the body apparatus 101 form an approximate annular space with a small opening, wherein the fixing apparatus 102 and the body apparatus 101 constitute a portion of the approximate annular space, respectively, a width of the small opening of the approximate annular space is less than a diameter of the columnar body (i.e., the first predetermined condition). In a preferred embodiment of the present application, the body apparatus 101 is a dial portion of a smart watch, and the fixing apparatus 102 is a strap portion of the smart watch. The annular space or the approximate annular space formed by the fixing apparatus 102 and the body apparatus 101 can surround the wrist of the user of the smart watch which serves as the columnar body, and a diameter of the annular space or the approximate annular space is greater than a diameter of the user's wrist and smaller than a diameter of the user's fist (i.e., the second predetermined condition).

Figure 1D:
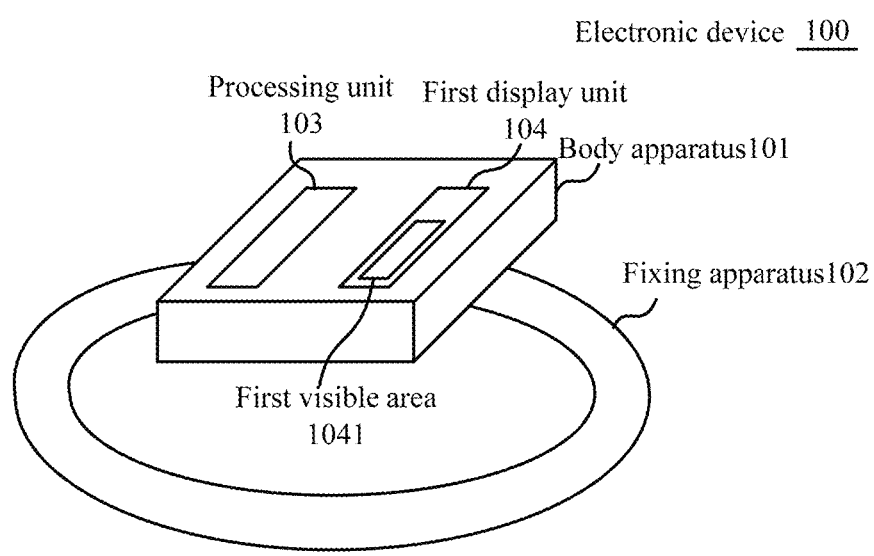
Figure 1E:
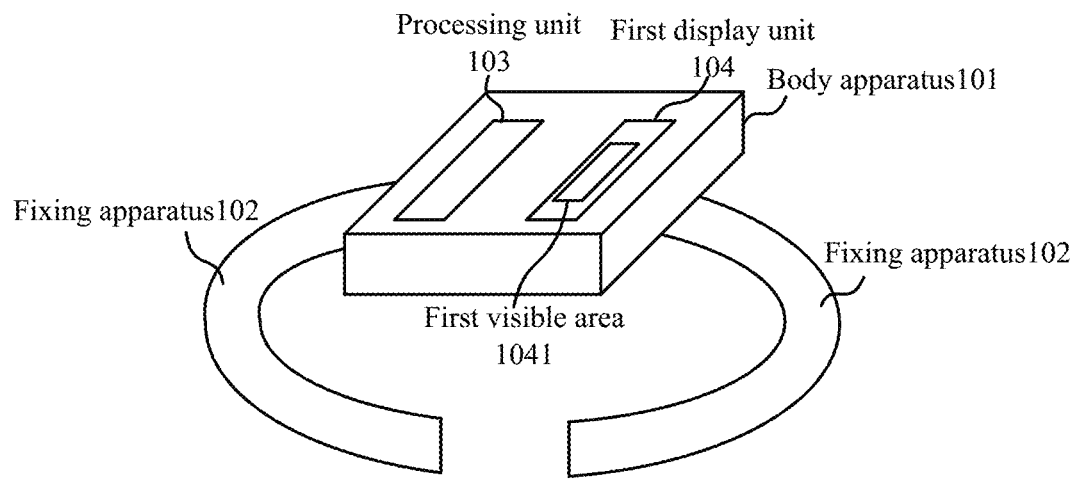

Further, of course, the annular space or the approximate annular space may be formed by the fixing apparatus 102 alone. As shown in FIGS. 1D and 1E, the body apparatus 101 may be provided on the fixing apparatus 102 (i.e., the body apparatus 101 is attached to the fixing apparatus 102 in the manner of surface contact), so that the fixing apparatus 102 alone forms the annular space (FIG. 1D) or the approximate annular space (FIG. 1E) that surrounds the columnar body. The fixing apparatus 102 is arranged with a fixing mechanism like hasps, snaps, zippers and so on (not shown).

Further, as shown in FIGS. 1A to 1E, a processing unit 103 and a first display unit 104 are arranged on the body apparatus 101. The processing unit 103 is configured to generate a first image and execute display control. In the electronic device 100 shown in FIGS. 1A to 1E, the first display unit 104 is arranged on the body apparatus 101. However, as will be readily appreciated by those skilled in the art, the present application is not limited thereto, in another embodiment of the present application, the first display unit 104 may also be arranged on the fixing apparatus 102. In yet another embodiment of the present application, the first display unit 104 may also be arranged on the body apparatus 101 and the fixing apparatus 102. For example, as will be further described in detail, the first display unit 104 will further include a light path converting component and a display component, the light path converting component may be provided partially on the body apparatus 101 and partially on the fixing apparatus 102; the display component may be provided on the body apparatus 101 or the fixing apparatus 102 as needed.

Further, as shown in FIGS. 1A to 1E, the first display unit 104 includes a first visible area 1041 for allowing first light corresponding to the first image exiting therefrom. The electronic device 100 has a first viewing area having a minimum area value in a first distance away from the first visible area, wherein the minimum area value is a first threshold for perceiving a complete display content of the first image. Hereinafter, principles and implementations of the first display unit 104 will be described in detail with reference to FIGS. 2A to 2D and FIGS. 3A to 3C.

Specifically, in an embodiment of the present application, the first display unit 104 may be a display unit having a near-vision optical display system that adopts a light guide optical element (LOE), it can provide the user with image or video display with a larger size or a higher resolution, break through the effect of size of the display unit per se. In addition, the first display unit 104 may also be a liquid crystal display (LCD), an organic electroluminescent display, an E-ink display etc.

Figure 2A:
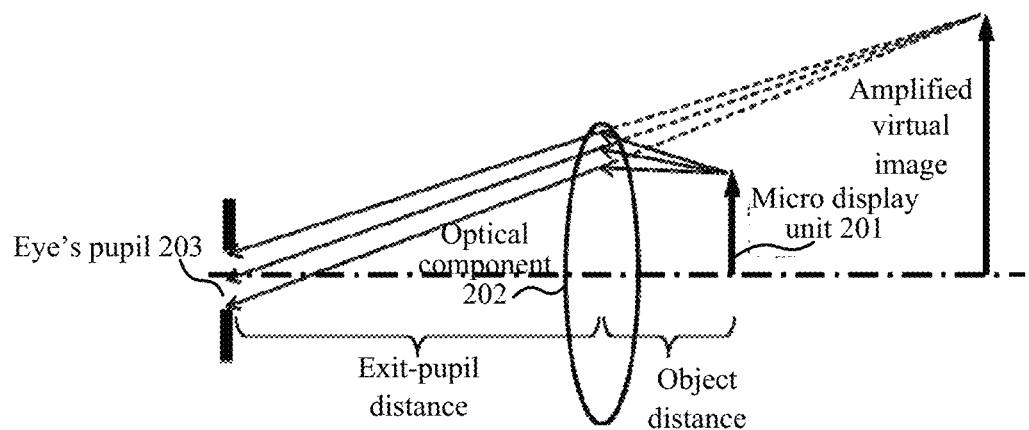
FIGS. 2A to 2D are schematic diagrams illustrating a near-vision optical display system adopted in the electronic device according to an embodiment of the present application.

FIG. 2A is a schematic diagram illustrating a near-vision optical display system adopted in the electronic device according to an embodiment of the present application. In the electronic device according to a first embodiment of the present application, a near-vision optical display system is adopted as the first display unit 104. As shown in FIG. 2, light corresponding to the displayed image and emitted by a micro display unit 201 in the near-vision optical display system is received by a light path converting component 202 such as a lens group and the light path converting component 202 performs the corresponding light path conversion. As a result, light on which light path conversion has already been performed enters the viewer's pupil 203 to form a magnified virtual image.

Figure 2B:
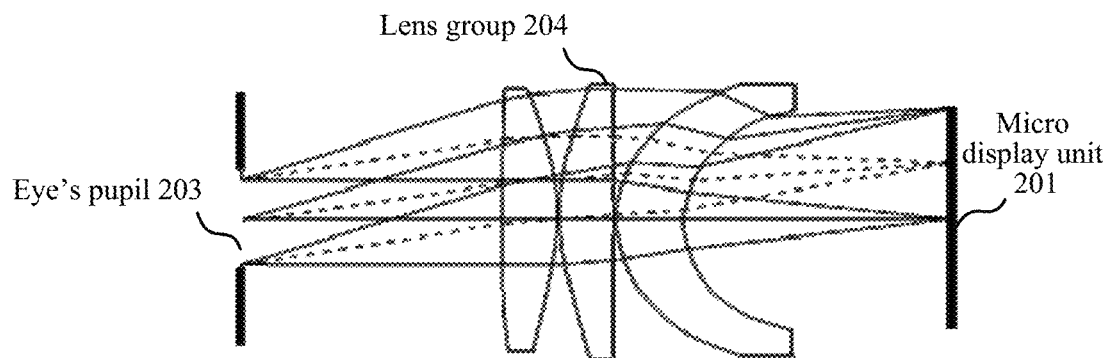
Figure 2C:
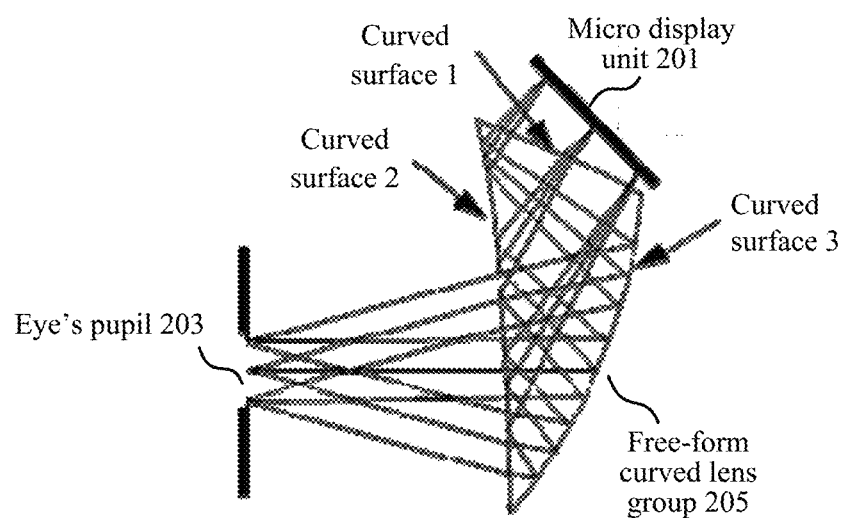
Figure 2D:
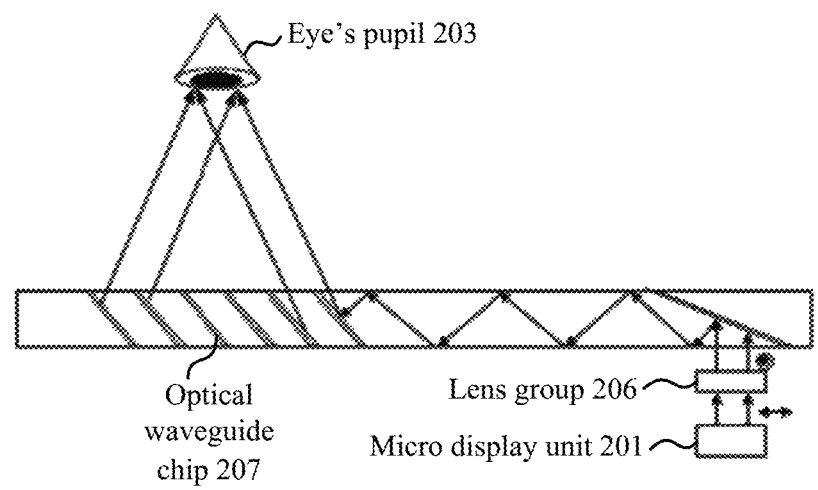

FIGS. 2B to 2D further illustrate three specific implementations based on the schematic diagram as shown in FIG. 2A. Specifically, the technical solution shown in FIG. 2B adopts a refractive-diffractive hybrid curved surface design, wherein the lens group 204 corresponds to the optical path converting component 202 shown in FIG. 2A, thereby the required lens volume is further reduced. The technical solution shown in FIG. 2C adopts a free-form curved surface design, wherein a free-form curved lens group 205 including a curved surface 1, a curved surface 2, and a curved surface 3 corresponds to the optical path converting component 202 shown in FIG. 2A, thereby the required lens volume is further reduced. The technical solution shown in FIG. 2D adopts a parallel plate design, which further includes an optical waveguide chip 207, in addition to the lens group 206 corresponding to the optical path converting component 202 shown in FIG. 2A. By using the optical waveguide chip 207, in the case of reducing thickness of the required lens, control like translation is performed on the exit direction of the light that forms the amplified virtual image (i.e., display direction of the magnified virtual image). As will be readily appreciated by those skilled in the art, the near-vision optical display system adopted in the electronic device according to the first embodiment of the present application is not limited to what is shown in FIGS. 2B to 2D, other implementations like a projection eyepiece design may also be adopted instead.

Figure 3A:
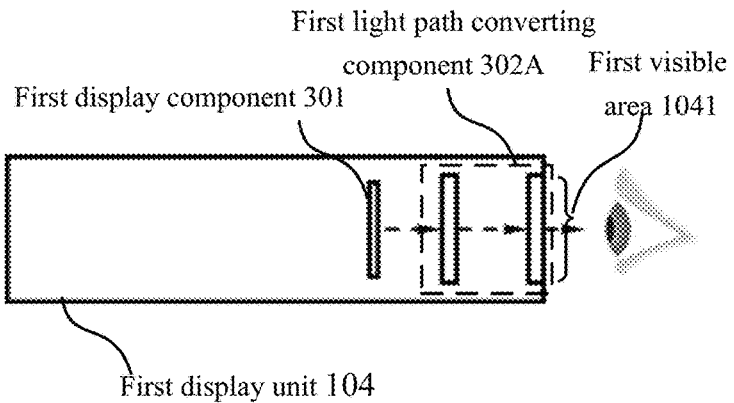
FIGS. 3A to 3C are schematic diagrams illustrating the first display unit in the electronic device according to an embodiment of the present application.
Figure 3B:
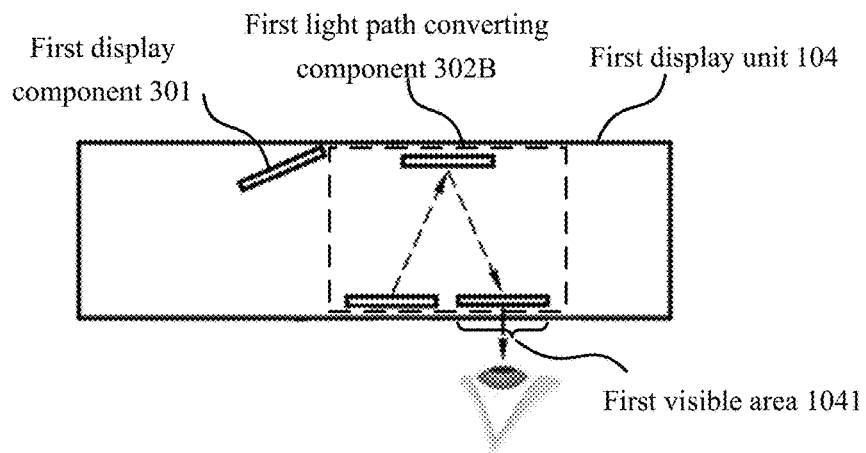
Figure 3C:
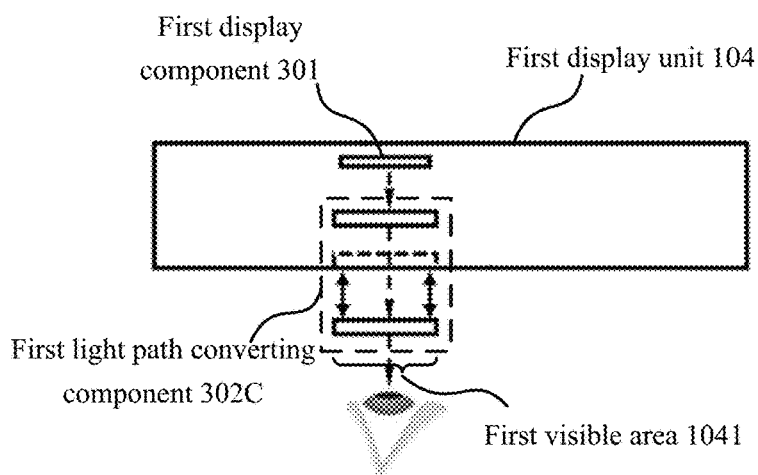

FIGS. 3A to 3C are schematic diagrams illustrating the first display unit in the electronic device according to an embodiment of the present application. The first display unit 104 in the electronic device 100 according to the first embodiment of the present application adopts the near-vision optical display system described above with reference to FIGS. 2A to 2D. The first display unit 104 includes a first display component 301 configured to display the first image and a first light path converting component 302 (first light path converting component 302A to 302C in FIGS. 3A to 3C) configured to receive and perform light path conversion on the light corresponding to the first image and emitted from the first display component 301 to thereby form an amplified virtual image corresponding to the first image.

Specifically, in FIG. 3A, the first display component 301 may be a micro display, and the first light path converting component 302A is formed by a lens group. The lens group forms an amplified image corresponding to the first image displayed by the first display component 301.

In FIG. 3B, also, the first display component 301 may be a micro display, and the first light path converting component 302B is formed by optical devices that perform multiple reflections within the device. In this case, as compared with the first light path converting component 302A as shown in FIG. 3A, space required by the first display unit 104 can be saved, thereby facilitating design and manufacture of a more miniaturized electronic device.

In FIG. 3C, also, the first display component 301 may be a micro display, and the first light path converting component 302C is formed by a zooming lens group that performs telescopic zooming under driving of a drive unit (not shown) within the device. In this case, as compared with the first light path converting component 302A as shown in FIG. 3A, it is possible to dynamically adjust size of the amplified virtual image displayed by the first display unit 104 through zooming, thereby meeting different requirements of the user.

As shown in FIGS. 3A to 3C, the area where the image content of the first display unit 104 is displayed as actually viewed by the user is the first visible area 1041 described with reference to FIGS. 1A to 1C. As for the first image exited from the first visible area 1041, a complete display content of the first image can be perceived when viewing the first visible area within the first viewing area, wherein when the first viewing area is away from the first visible area by a first distance, the first viewing area has a minimum area value, which is a first threshold. No matter using a display unit having a near-vision optical display system that adopts a light guide optical element (OLE) as shown in FIGS. 2A to 3C, or an ordinary display like a liquid crystal display (LCD), an organic electroluminescent display, an E-ink display etc., in order to better protect private information, it is all desired to properly control the scope of the first viewing area, so that the user located in a proper scope of the first viewing area may clearly, completely view the displayed first image, while it can result in that a person located outside the scope of the first viewing area cannot perceive the first image or cannot perceive the complete content of the first image. Specific examples of the viewing area of the electronic device according to an embodiment of the present will be described below.

Figure 4:
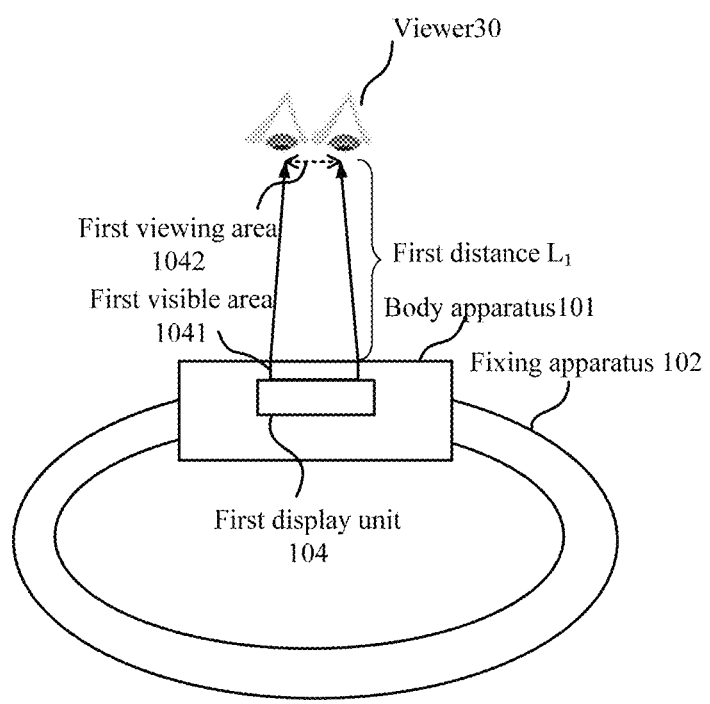
FIG. 4 is a schematic diagram illustrating the viewing area of the electronic device in a first example according to an embodiment of the present application.

FIG. 4 is a schematic diagram illustrating the viewing area of the electronic device in a first example according to an embodiment of the present application. As shown in FIG. 4, the first display unit 104 has a first visible area 1041. Light corresponding to the first image exits from the first visible area 1041, the electronic device 100 has a first viewing area 1042; a complete display content of the first image can be perceived when viewing the first visible area 1041 within the first viewing area 1042.

In the viewing state as show in FIG. 4, when the first viewing area 1042 has a minimum area value in a first distance $L_1$ away from the first visible area 1041, wherein the minimum area value is a first threshold for perceiving a complete display content of the first image. When the first display unit 104 is a display unit having a near-vision optical display system that adopts a light guide optical element (OLE), the user's eyes are close to the first display unit 104 to view. In this case, the first threshold preferable matches with a size of eyes of the user, for example, it is 3 cm², and the first distance $L_1$ is preferably like 15 mm to 50 mm. In an embodiment of the present application, it is possible to control the first visible area 1041 to be less than a second threshold corresponding to the first threshold of the first viewing area, so that the scope of the first viewing area 1042 satisfies the first threshold when the first viewing area is away from the first visible area 1041 by the first distance, and the user located outside the scope of the first viewing area 1042 cannot perceive the display content of the first image, or at least cannot perceive the complete display content of the first image. It should be understood that, the second threshold of the first visual 1041 differs depending on the different display principles of the first display unit 104. As will be described later, it is possible to configure respective components of the first display unit 104 according to the requirement of limiting the scope of the first viewing area 1042, including the second threshold of the first visible area 1041. For example, in an embodiment of the present application, in the case where the first display unit 104 is a display unit having a near-vision optical display system that adopts a light guide optical element (OLE), the second threshold may be configured as for example 0.2 square inches.

Figure 5:
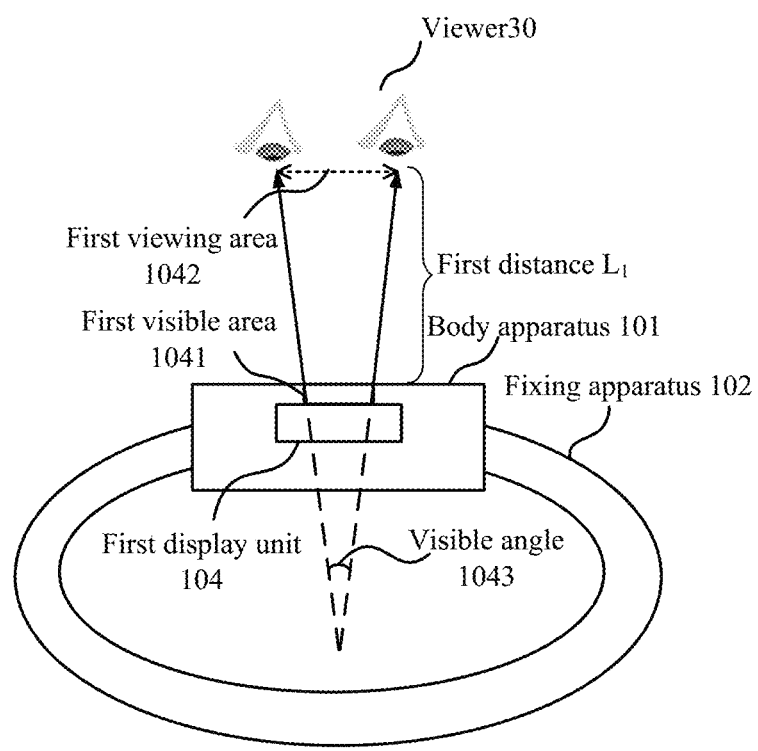
FIG. 5 is a schematic diagram illustrating the viewing area of the electronic device in a second example according to an embodiment of the present application.

FIG. 5 is a schematic diagram illustrating the viewing area of the electronic device in a second example according to an embodiment of the present application. As shown in FIG. 5, the first display unit 104 has a visible angle 1043, which is a maximum solid angle between the light corresponding to the first image and exiting from the first visible area 1041 and a normal line of the first visible area 1041.

In the viewing state as shown in FIG. 5, when the first display unit 104 is an ordinary display like a liquid crystal display (LCD), an organic electroluminescent display, an E-ink display etc., the user's eyes are at a distance relatively far from the first display unit 104 to view. In this case, the first threshold preferable matches with a size of viewing space area of the user herself/himself, for example, it is 40 cm², and the first distance $L_1$ is preferably like 10 mm to 15 mm. In an embodiment of the present application, it is possible to control the first visible area 1041 to be less than a third threshold and the visible angle 1043 to be less than a fourth threshold corresponding to the first threshold of the first viewing area, so that the scope of the first viewing area 1042 satisfies the first threshold when the first viewing area is away from the first visible area 1041 by the first distance. It should be also understood that, the third threshold of the first visual 1041 and the fourth threshold of the visible angle 1043 also differ depending on the different display principles of the first display unit 104. For example, in an embodiment of the present application, in the case where the first display unit 104 is a display unit like a liquid crystal display (LCD), the third threshold of the first visible area 1041 is set as a little less than the first threshold, for example, the third threshold is 30 cm², and the fourth threshold of the visible angle 1043 is correspondingly set as 30 degrees. As will be described later, it is possible to configure respective components of the first display unit 104 according to the requirement of limiting the scope of the first viewing area 1042, including the third threshold of the first visual 1041 and the fourth threshold of the visible angle 1043.

Figure 6:
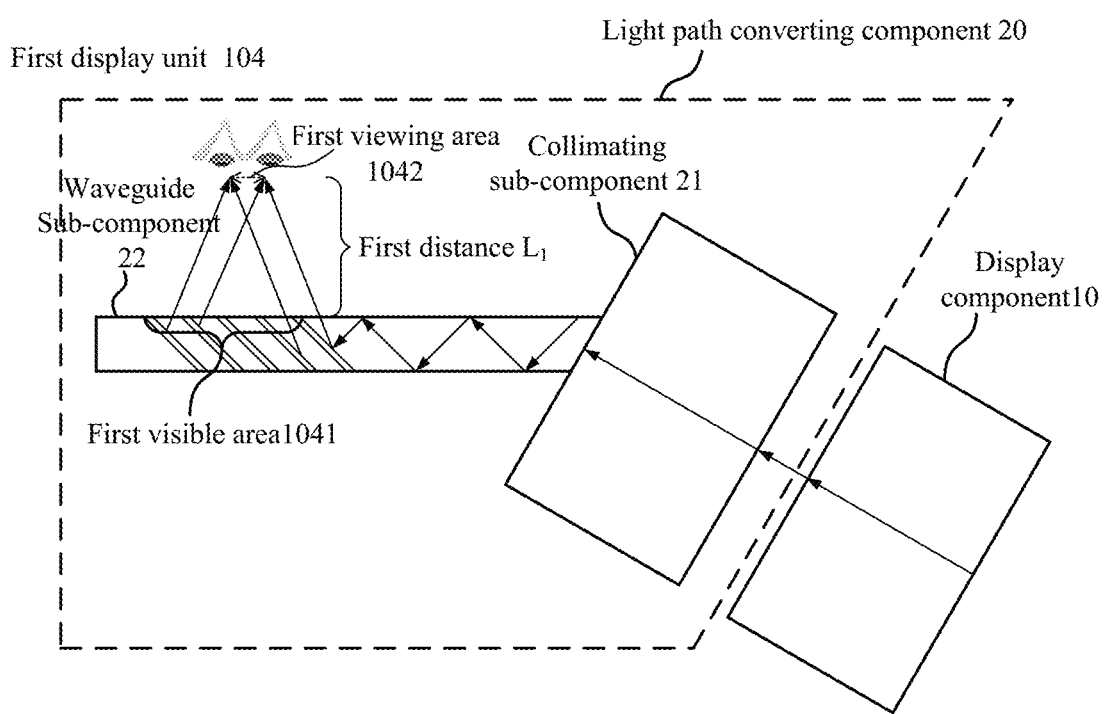
FIG. 6 is a schematic diagram illustrating the viewing area of the electronic device in a third example according to an embodiment of the present application.

FIG. 6 is a schematic diagram illustrating the viewing area of the electronic device in a third example according to an embodiment of the present application. As shown in FIG. 6, the first the first display unit 104 includes a display component 10 configured to emit the first light and a light path converting component 20 configured to perform light path conversion on the first light corresponding to the first image and emitted from the display component 10 to form a magnified virtual image corresponding to the first image.

As shown in FIG. 6, a minimum plane which the first light used to form the magnified virtual image corresponding to the first image in common travels through is the first visible area 1042, its area is the first threshold, the minimum plane is away from the first visible area 1041 by the first distance $L_1$. The minimum plane which the light used to form the magnified virtual image corresponding to the first image in common travels through is an exit-pupil surface of the first display unit 104, the first distance $L_1$ is an exit-pupil distance of the first display unit 104. As described above with reference to FIG. 4, the area of the first viewing area 1042 is the first threshold, area of the exit-pupil surface of the first display unit 104 matches with the size of eyes of the user, for example, 3 cm², and, in this case, the first distance $L_1$ is preferable 15 nm to 50 nm.

Figure 7A:
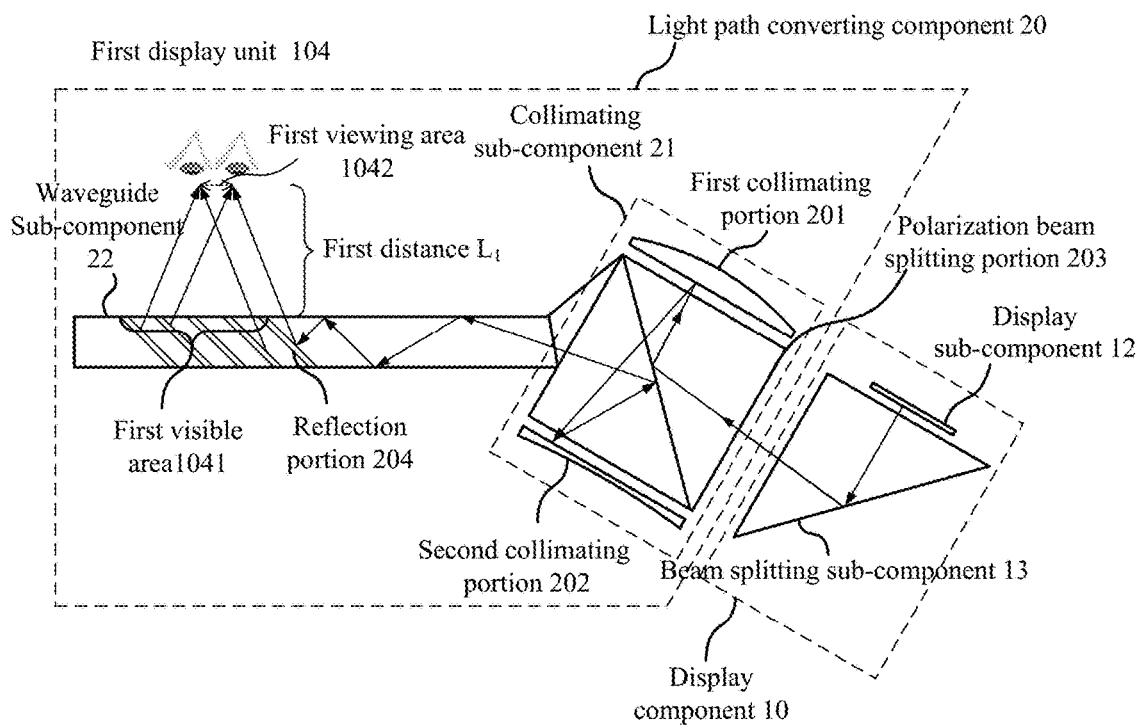
FIGS. 7A and 7B are schematic diagrams further illustrating the viewing area of the electronic device in the third example according to an embodiment of the present application.
Figure 7B:
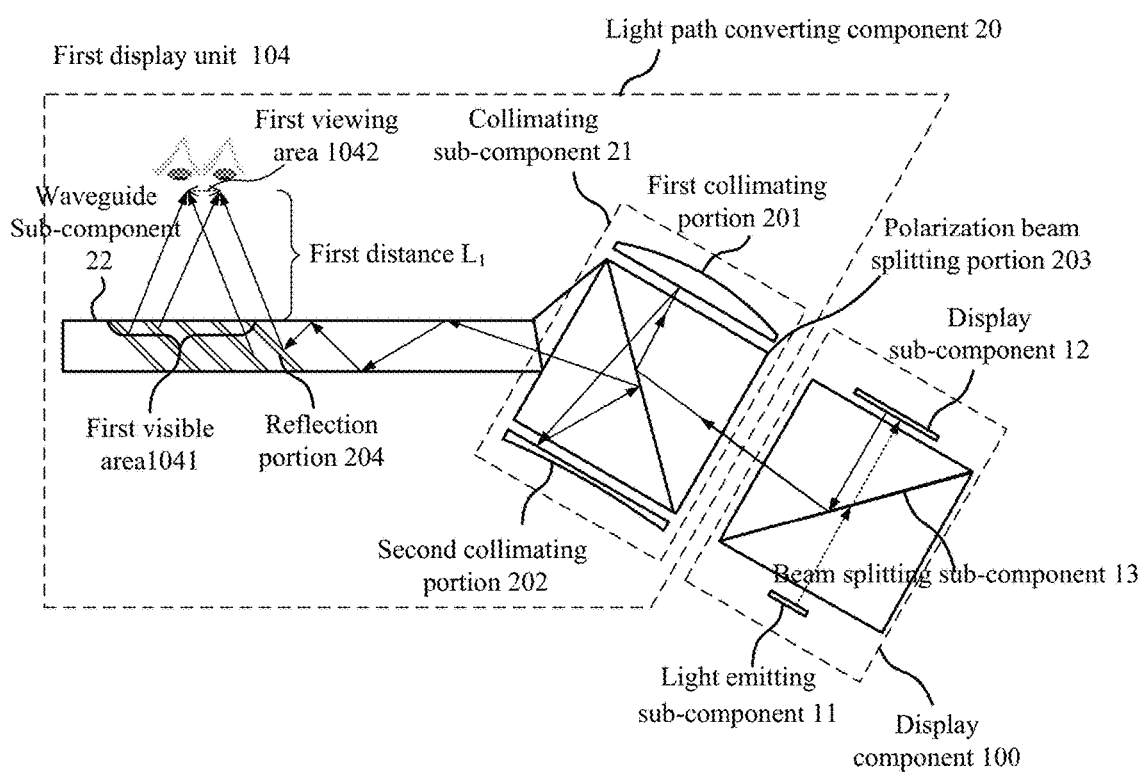

FIGS. 7A and 7B are schematic diagrams further illustrating the viewing area of the electronic device in the third example according to an embodiment of the present application.

Specifically, the display component 10 includes a display sub-component 12 and a beam splitting sub-component 13 (as shown in FIG. 7A). Alternatively, the display component 10 includes a light emitting sub-component 11, a display sub-component 12, and a beam splitting sub-component 13 (as shown in FIG. 7B).

As shown in FIGS. 7A and 7B, the light path converting component 20 further includes a collimating sub-component 21 and a waveguide sub-component 22, the collimating sub-component 21 is configured to collimate the first light coming from the display component 10, and lead the same into the waveguide sub-component 22. Specifically, the collimating sub-component 21 includes a first collimating portion 201 and a second collimating portion 202 provided opposite to each other, and a polarization beam splitting portion 203 provided between the first collimating portion 201 and the second collimating portion 202, the first light corresponding to the first image and coming from the display component 10 is reflected by the polarization beam splitting portion 203 to the first collimating portion 201, thereafter it is collimated by the first collimating portion 201 and the second collimating portion 202, and exited by the polarization beam splitting portion 203. The waveguide sub-component 22 guides the first light coming from the collimating sub-component 21 to the particular position, wherein the first light is for forming the virtual image corresponding to the first image. In a preferred embodiment of the present application, the first collimating portion 201 and the second collimating portion 202 may be a single lens or a lens group as needed by design. It is possible to implement adjustment of a size of the virtual image corresponding to the first image by adjusting the relative position of the lens or lens group by which the first collimating portion 201 and the second collimating portion 202 are configured.

In addition, as shown in FIGS. 7A and 7B, the waveguide sub-component 22 further includes a plurality of reflection portions 204, it is possible to control to guide the first light from the collimating sub-component 21 to the particular position to exit, by setting the position and angle of the plurality of reflection portions 204. In order to control the scope of the first viewing area 1042, the number of the plurality of reflection portions 204 may be controlled. In an embodiment of the present application, when the number of the plurality of reflection portions 204 is less than a fifth threshold, the first viewing area 1042 is away from the first visible area 1041 by the first distance $d_1$, the scope of the first viewing area 1042 has the minimum area value, that is, the first threshold described above with reference to FIG. 4. In an embodiment of the present application, the number of the fifth threshold of the plurality of reflection portions 204 may be for example 5 to 8. In addition, it is possible to adjust the number and angle of the plurality of reflection portions 204, to make the first visible area 1041 be less than a third threshold, the visible angle 1043 be less than a fourth threshold, so that the scope of the first viewing area 1041 satisfies the first threshold when the first viewing area is away from the first visible area by the first distance.

Further, it is possible to achieve effective control over the scope of the first viewing area 1042 by adjusting the display area of the display sub-component 12 that constitutes the display component (i.e., the display sub-component 12 serves as the visible area of the micro display chip), or the configuration of the lens groups of the first collimating portion 201 and the second collimating portion 202 that constitute the first collimating sub-component 21, and optical parameters of the respective lens.

As illustrated above with reference to FIGS. 4 to 7B, in order to achieve control over the scope of the first viewing area of the electronic device 100, the visible area of the display unit is reduced or the visible angle of the display unit is limited, or a combination of the two is adopted. For example, FIG. 4 shows a first example of adopting the measure of reducing the visible area of the display unit, FIG. 5 shows adopting a combination of reducing the visible area of the display unit and limiting the visible angle of the display unit. FIG. 6 to FIG. 7B further show adopting the measure of configuring specific portions in the entire optical system (i.e., the number and angle of the plurality of reflection portions 204 in the waveguide sub-component 22), so as to indirectly achieve the effect of reducing the visible area of the display unit, and thereby achieving control over the scope of the first viewing area of the electronic device 100. As will be easily understood, as an optical system in entirety, it is possible to achieve control over the scope of the first viewing area of the electronic device 100, by controlling setting of the specific portions in the display unit and other components that matched thereto.

Figure 8A:
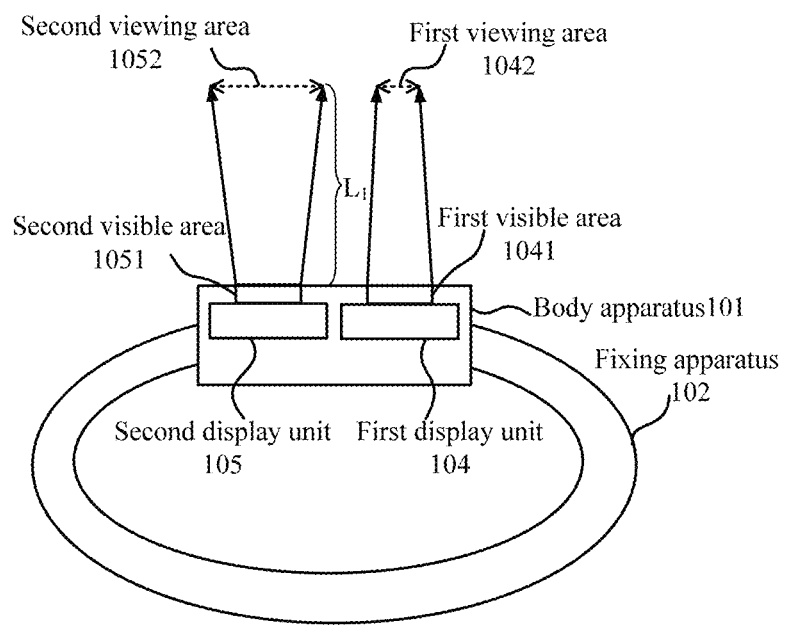
FIGS. 8A and 8B are schematic diagrams illustrating the viewing area of the electronic device in a fourth example according to an embodiment of the present application.
Figure 8B:
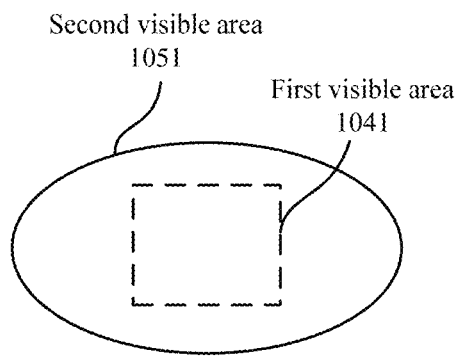

FIGS. 8A and 8B are schematic diagrams illustrating the viewing area of the electronic device in a fourth example according to an embodiment of the present application. As shown in FIG. 8A, in addition to the first display unit 104 described above with reference to FIG. 4, a second display unit 105 is further included. The second display unit 105 is provided on the body apparatus 101 and/or the fixing apparatus 102 and configured to output a second image. In the example shown in FIG. 8A, the first display unit 104 and the second display unit 105 are set schematically in parallel. The present application is not limited thereto, the first display unit 104 and the second display unit 105 may be set overlapped or at least partially overlapped.

Like the first display unit 104, the second display unit 105 has a second visible area 1051 for allowing second light corresponding to the second image exiting therefrom, the electronic device 100 has a second viewing area 1052 from which the second visible area 1051 is viewed for perceiving a complete display content of the second image.

In an embodiment of the present application, the first display unit 104 and the second display unit 105 operate on different display principles. Specifically, the first display unit 104 is a display unit having a near-vision optical display system that adopts a light guide optical element (OLE), the second display unit 105 is an ordinary display like a liquid crystal display (LCD), an organic electroluminescent display, an E-ink display etc. As schematically shown in FIG. 8A, due to the different display principles of the first display unit 104 and the second display unit 105, a first area value of the first viewing area 1042 and a second area value of the second viewing area 1052 are different when the first viewing area 1042 and the second viewing area 1052 are away from per unit area of the first visible area 1041 and per unit area of the second visible area 1051 respectively by the same distance $L_1$. Specifically, the first area value of the first viewing area 1042 is less than the second area value of the second viewing area 1052.

FIG. 8B schematically shows a cross-section shape of the first viewing area 1042 of the first display unit 104 and the second viewing area 1052 of the second display unit 105. As shown in FIG. 8B, the cross-section shape of the first viewing area 1042 may be a rectangular adaptive to the viewing habits that the user uses the first display unit 104 having a near-vision optical display system that adopts a light guide optical element (OLE). The cross-section shape of the second viewing area 1052 may be oval circular adaptive to an outer shape of the wearable electronic device like a smart watch.

Figure 9:
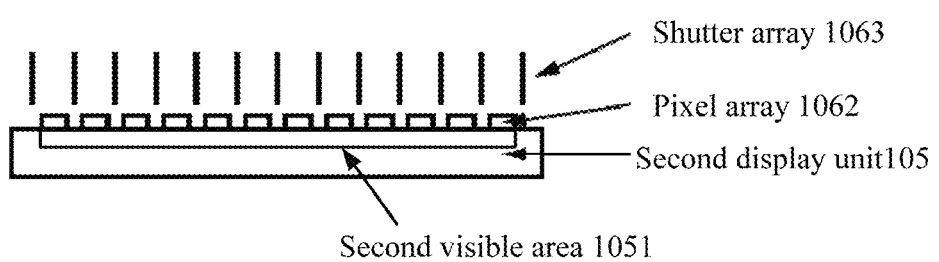
FIG. 9 is a schematic diagram further illustrating the second display unit in the electronic device according to an embodiment of the present application.

FIG. 9 is a schematic diagram further illustrating the second display unit in the electronic device according to an embodiment of the present application. As shown in FIG. 9, the second display unit 105 is an ordinary display unit composed by a pixel array, such as LCD or OLED. The second display unit 105 comprises a second display area 1051 in which a pixel array 1062 is configured. In order to control the scope of the second viewing area 1052 of the second display unit 105 in entirety, a shutter array 1063 is configured corresponding to the pixel array 1062. The shutter array 1063 is used to display a light emitting angle of each sub-pixel of the pixel array 1062, so that each sub-pixel can only emit displaying light within an limited angle, thus achieving control over the visible angle of the second display unit 105, and further achieving control over the scope of the second viewing area 1052 of the second display unit 105.

Figure 10:
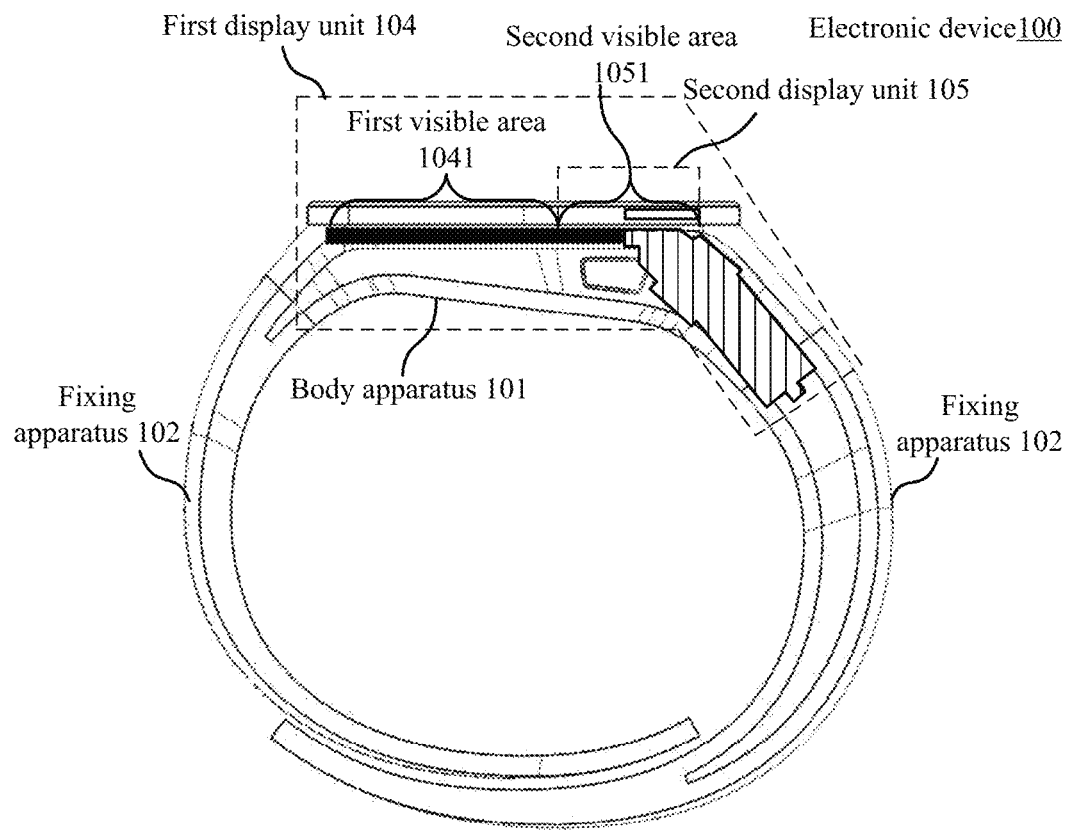
FIG. 10 is a structural perspective diagram illustrating the electronic device according to an embodiment of the present application.

FIG. 10 is a structural perspective diagram illustrating the electronic device according to an embodiment of the present application. As shown in FIG. 10, the first display unit 104 has a first visible area 1041, the second display unit 105 has a second visible area 1051, an edge where the first visible area 1041 and the second visible area 1051 border on each other is a curve. As can be seen from FIG. 10, in order to concurrently configure the first display unit 104 and the second display unit 105 in the electronic device 100, the second display unit 105 needs to satisfy being an irregular shape and a narrow frame.

Hereinafter, the second display unit 105 will be further described with reference to FIGS. 11 to 13B.

The second display unit according to an embodiment of the present application may be a second display unit such as a liquid crystal display, an LED display, a plasma display or the like to which a drive signal needs to be provided.

Figure 11:
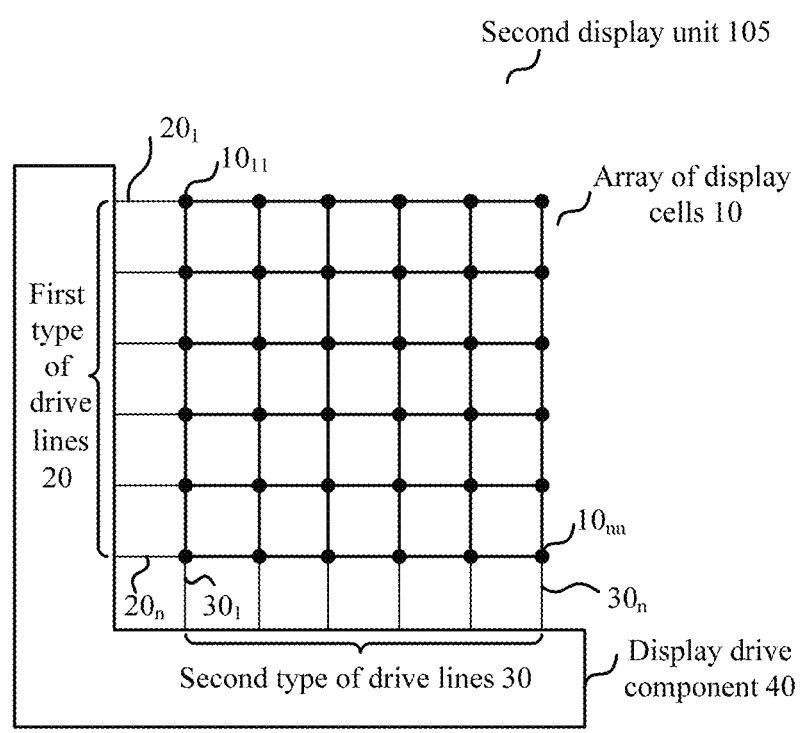
FIG. 11 is a structural block diagram briefly illustrating the second display unit according to an embodiment of the present application.

FIG. 11 is a structural block diagram briefly illustrating the second display unit according to an embodiment of the present application. As shown in FIG. 11, the second display unit 105 comprises an array of display cells 10, a plurality of first type of drive lines 20, a plurality of second type of drive lines 30, and a display drive component 40. Specifically, the array of display cells 10 includes a plurality of display sub-units $10_{11} \ldots 10_{nn}$. As can be readily appreciated, the array of display cells 10 composed by a plurality of display sub-units as shown in FIG. 11 is merely illustrative, wherein the number of the plurality of display sub-units and their specific layout may vary depending on the design and use requirements. Each ($20_1 \ldots 20_n$) of the plurality of first type of drive lines 20 intersects with each ($30_1 \ldots 30_n$) of the plurality of second type of drive lines 30, intersection thereof corresponds to each display sub-unit of the plurality of display sub-units ($10_{11} \ldots 10_{nn}$), so as to provide a display drive signal for each display sub-unit. The display drive component 40 is connected with the plurality of first type of drive lines and the plurality of second type of drive lines, so as to provide a display drive signal for the plurality of first type of drive lines and the plurality of second type of drive lines.

Different than the configuration manner that a plurality of first type of drive lines and a plurality of second type of drive lines are connected respectively to a horizontal drive unit and a vertical drive unit in the prior art, the second display unit 105 according to an embodiment of the present application may comprise only a single display drive component 40, thereby wiring space needed for arranging the display drive component is saved and design complexity is simplified. In addition, in the second display unit 105 according to an embodiment of the present application, the plurality of first type of drive lines 20 and the plurality of second type of drive lines 30 are divided into at least two groups of drive lines, each group of the at least two groups of drive line is connected to the display drive component 40. Such way of connecting the drive lines in group will greatly reduce the edge wiring of the second display unit 105, so that the frame that packets it can become narrow as much as possible and flexibly adapt to different frame shapes. Specific configurations of the second display unit according to the embodiment of the present application will be further described below with reference to FIGS. 12A to 19B.

Figure 12A:
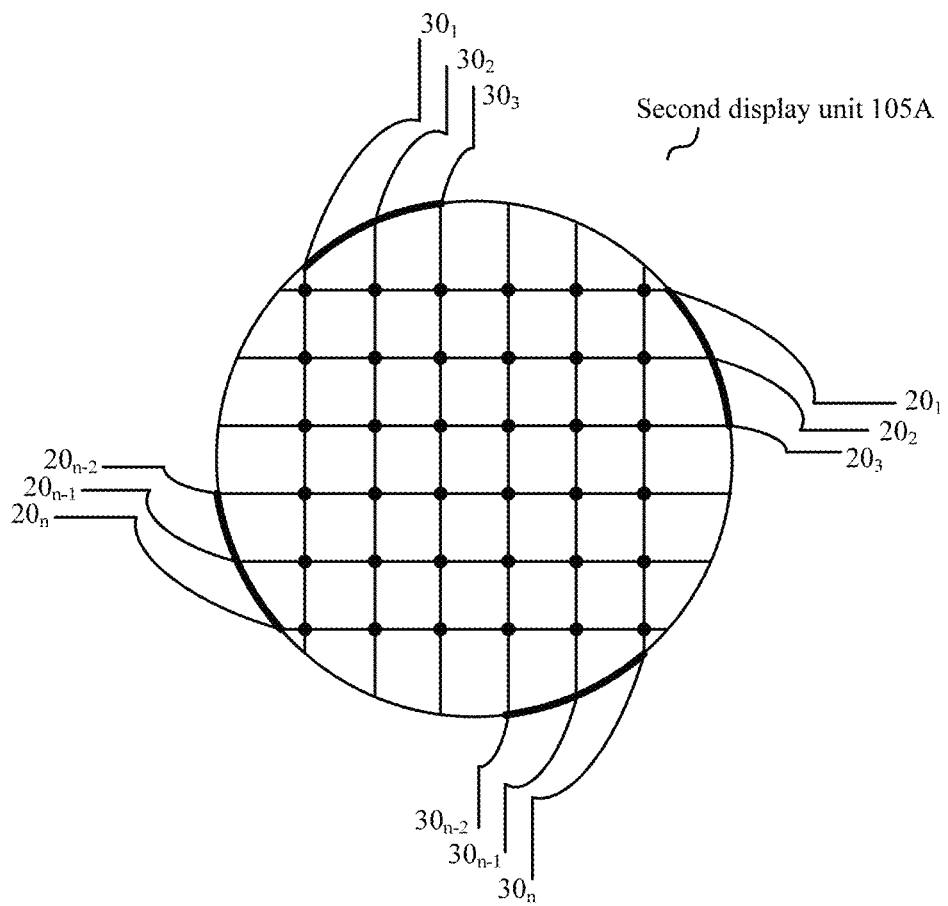
FIGS. 12A to 12C are a top surface view, a bottom surface view, and a side view illustrating a first example of the second display unit according to an embodiment of the present application.
Figure 12B:
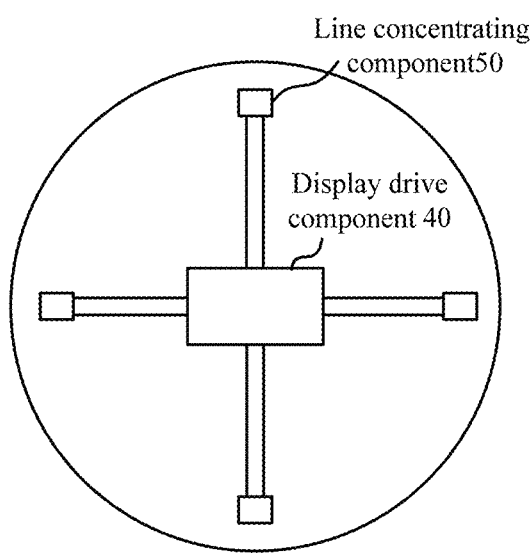
Figure 12C:
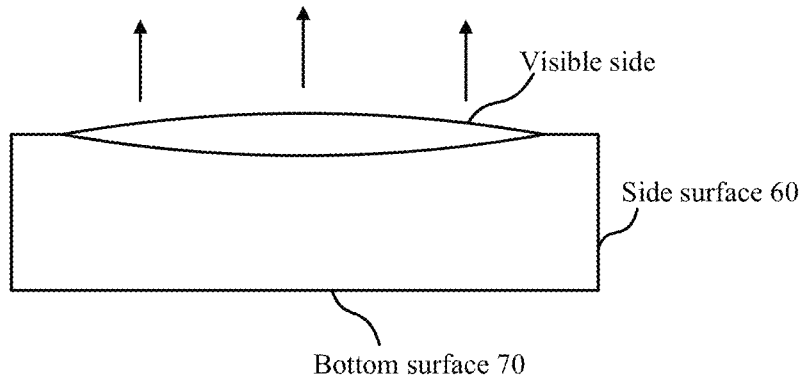

FIGS. 12A to 12C are a top surface view, a bottom surface view, and a side view illustrating a first example of the second display unit according to an embodiment of the present application. Specifically, FIG. 12A is a top surface view illustrating a second display unit 105A according to the first embodiment of the present application. As can be readily appreciated, the number of the drive lines and the wiring manner as shown in FIG. 12A are merely illustrative, the second display unit 105A according to an embodiment of the present application is not limited thereto. As shown in FIG. 12A, the plurality of first type of drive lines and the plurality of second type of drive lines are divided into a plurality of groups of drive lines (four groups as shown in FIG. 12A). As can be seen from FIG. 12A, by adopting such grouped wiring manner, the wiring area at the edge of the second display unit 105A tends to cluster, which thereby facilitates further narrowing the frame of the second display unit 105A. That is to say, in an electronic device where the second display unit 105A according to an embodiment of the present application is configured, the second display unit 105A can adapt to the shape of the electronic device as needed. Specifically, by adopting grouped configuration for the wiring of the second display unit 105A, it is possible to select the edge of the second display unit 105A that adapt to wiring based on the shape of the electronic device as the area where wiring groups are configured, and select not to configure wiring at the edge having no wiring space of the second display unit 105A based on the shape of the electronic device. Herein, the edge having no wiring space of the second display unit 105A may be an edge where the edge of the second display unit 105A substantially overlaps with the outer frame of the electronic device per se. Alternatively, the edge of having no wiring space the second display unit 105A may be an edge of the electronic device where the outer frame thereof is of an irregular shape and thus is inconvenient for wiring. Detailed examples will be described below with reference to the drawings.

Further, FIG. 12B is a bottom surface view illustrating a second display unit 105A according to the fourth embodiment of the present application. As shown in FIG. 12B, the second display unit 105A further comprises a plurality of line concentrating components 50, each group of the plurality of groups of drive lines, into which the plurality of first type of drive lines and the plurality of second type of drive lines are divided, is connected to the display drive component 40 via one of the line concentrating components 50, number of input terminals of one of the line concentrating components 50 connected with each group of the at least two groups of drive lines is M, number of output terminals connected to the display drive component 40 is N, and M>N. In the embodiment shown in FIG. 12B, number of the input terminals by which one of the line concentrating components 50 and one group of drive lines are connected is three, and number of the output terminals connected to the display drive component 40 is two. Adopting such wiring manner of connecting the display drive unit via the line concentrating unit after grouping, it is possible to further reduce the number of wiring needed for executing display drive. Of course, as can be readily appreciated, the second display unit 105A according to an embodiment of the present application is not limited thereto, instead, the grouped group of drive lines may be directly connected to the display drive component 40 without the line concentrating component 50.

Furthermore, FIG. 12C is a side view illustrating a second display unit 105A according to the fourth embodiment of the present application. As shown in FIG. 12C, a side of the surface where the array of display cells 10 residues is a visible side, and at least a portion of the plurality of first type of drive lines 20 and the plurality of second type of drive lines 30 and the display drive component 40 are provided at the other side of the surface. In particular, the display drive component 40 is located at a bottom surface 70 of the second display unit 105A, the second display unit 105A further comprises a side surface 60 that connects an edge of the surface where the array of display cells 10 residues and the bottom surface 70, the plurality of first type of drive lines 20 and the plurality of second type of drive lines 30 are provided along the side surface 60. In the side view as shown in FIG. 12C, a distance from a projection, on a plane vertical to the visible direction (that is, the bottom surface 70), of part of the plurality of first type of drive lines 20 and the plurality of second type of drive lines 30 on the surface where the array of display cells 10 residues to the edge of the surface where the array of display cells 10 residues is L. The distance L satisfies being less than a predetermined threshold. The predetermined threshold may be set as needed by design and display requirements, for example, it may be set as ten mm, five mm, or one mm. Even in the case of grouped wiring, the distance L may be zero. That is to say, at the edge where the drive lines do not turn downward so as to connect the display drive component 40, it is possible that there is no wiring for the drive lines, and at the edge of this portion, the frame other than the visible area on the surface where the array of display cells residues is the narrowest.

Figure 13A:
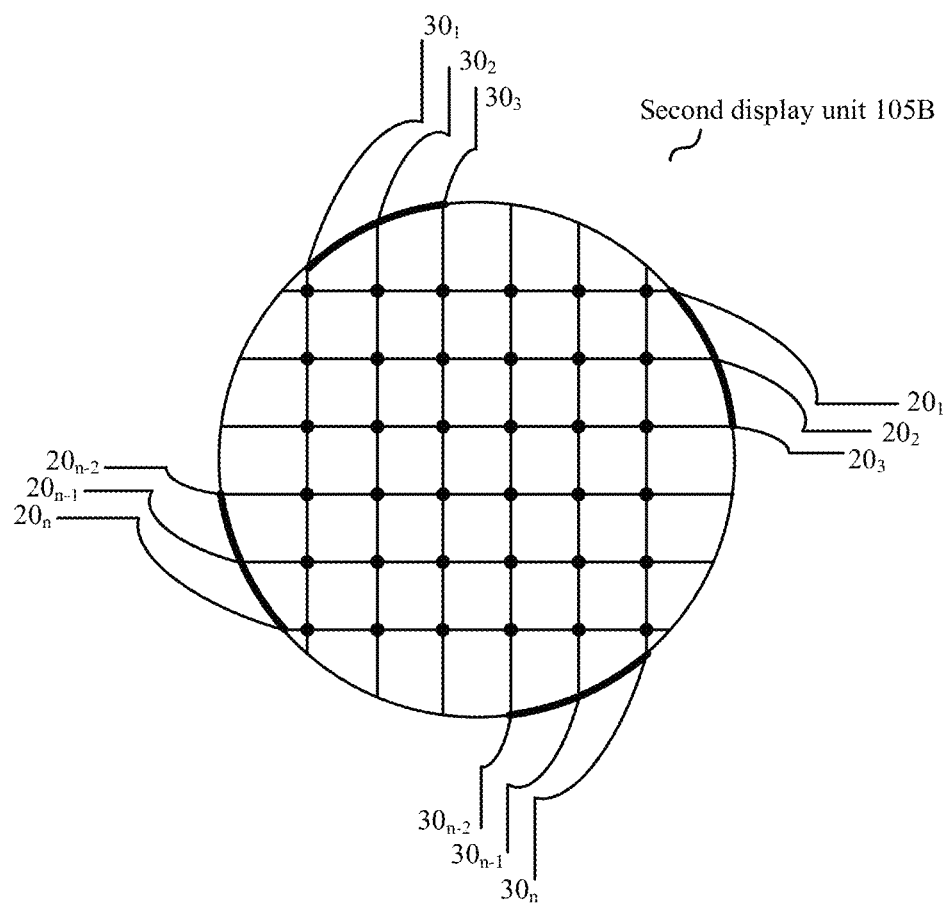
FIGS. 13A to 13B are schematic diagrams illustrating a second example of the second display unit according to an embodiment of the present application.
Figure 13B:
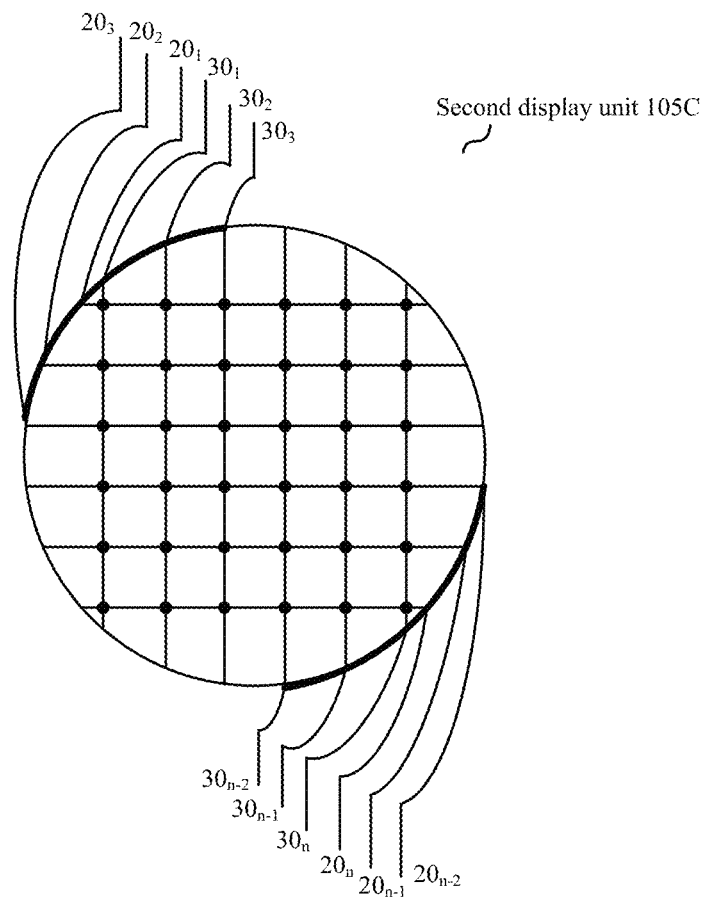

FIGS. 13A to 13B are schematic diagrams illustrating a second example of the second display unit according to an embodiment of the present application. In the second display units 105B and 105C according to the embodiment of the present application, each group into which the plurality of first drive lines and the plurality of second drive lines are divided may include only the first type of drive lines or the second type of drive lines, or each group into which the plurality of first drive lines and the plurality of second drive lines are divided may include the first type of drive lines and the second type of drive lines. Specifically, as shown in FIG. 13A, in the second display unit 105B according to the embodiment of the present application, each group into which the plurality of first drive lines and the plurality of second drive lines are divided may include only the first type of drive lines (the group composed by $20_1$, $20_2$, $20_3$ and the group composed by $20_{n-2}$, $20_{n-1}$, $20_n$) or the second type of drive lines (the group composed by $30_1$, $30_2$, $30_3$ and the group composed by $30_{n-2}$, $30_{n-1}$, $30_n$). In contrast, as shown in FIG. 13B, in the second display units 105C according to the embodiment of the present application, each group into which the plurality of first drive lines and the plurality of second drive lines are divided may include the first type of drive lines (the group composed by $20_1$, $20_2$, $20_3$, $30_1$, $30_2$, $30_3$) and the second type of drive lines (the group composed by $20_{n-2}$, $20_{n-1}$, $20_n$, $30_{n-2}$, $30_{n-1}$, $30_n$). As can be seen from FIGS. 13A to 13B, adopting such grouped wiring manner, the grouping manner of the plurality of first drive lines and the plurality of second drive lines is more flexible, the drive lines can be selected to compose the group as needed by design and display requirements, without being restricted by the type of the drive lines per se.

Figure 14A:
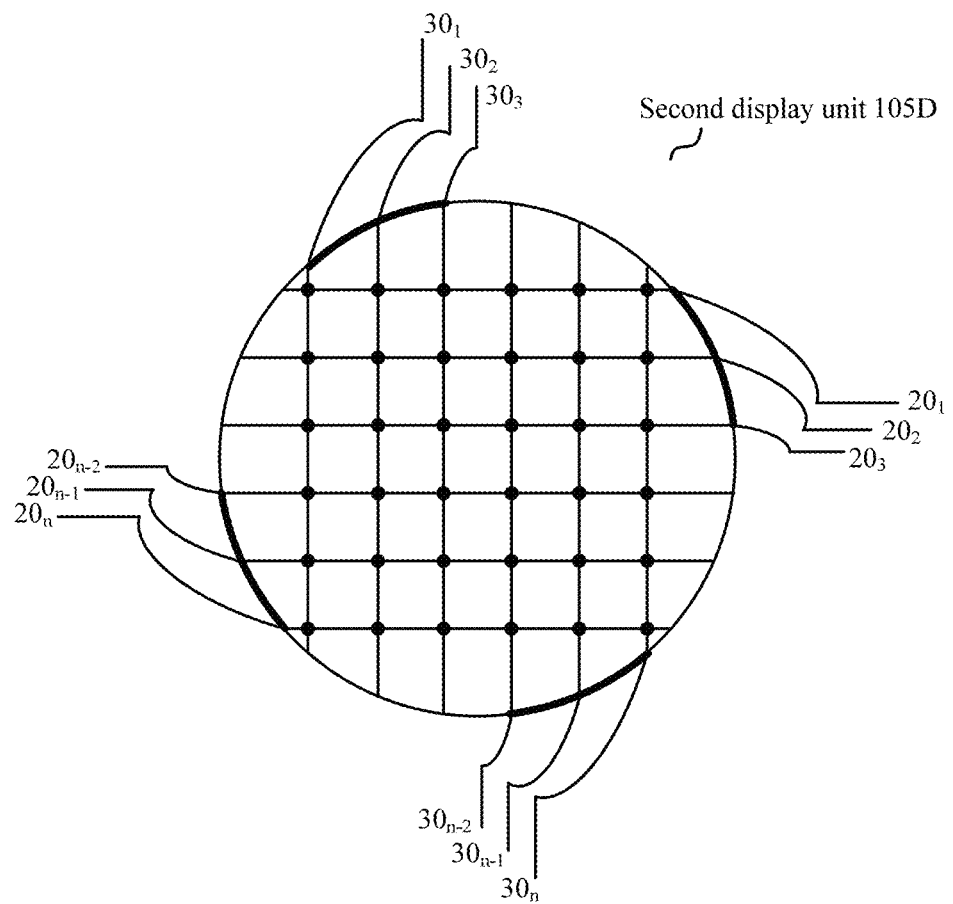
FIGS. 14A to 14B are schematic diagrams illustrating a third example of the second display unit according to an embodiment of the present application.
Figure 14B:
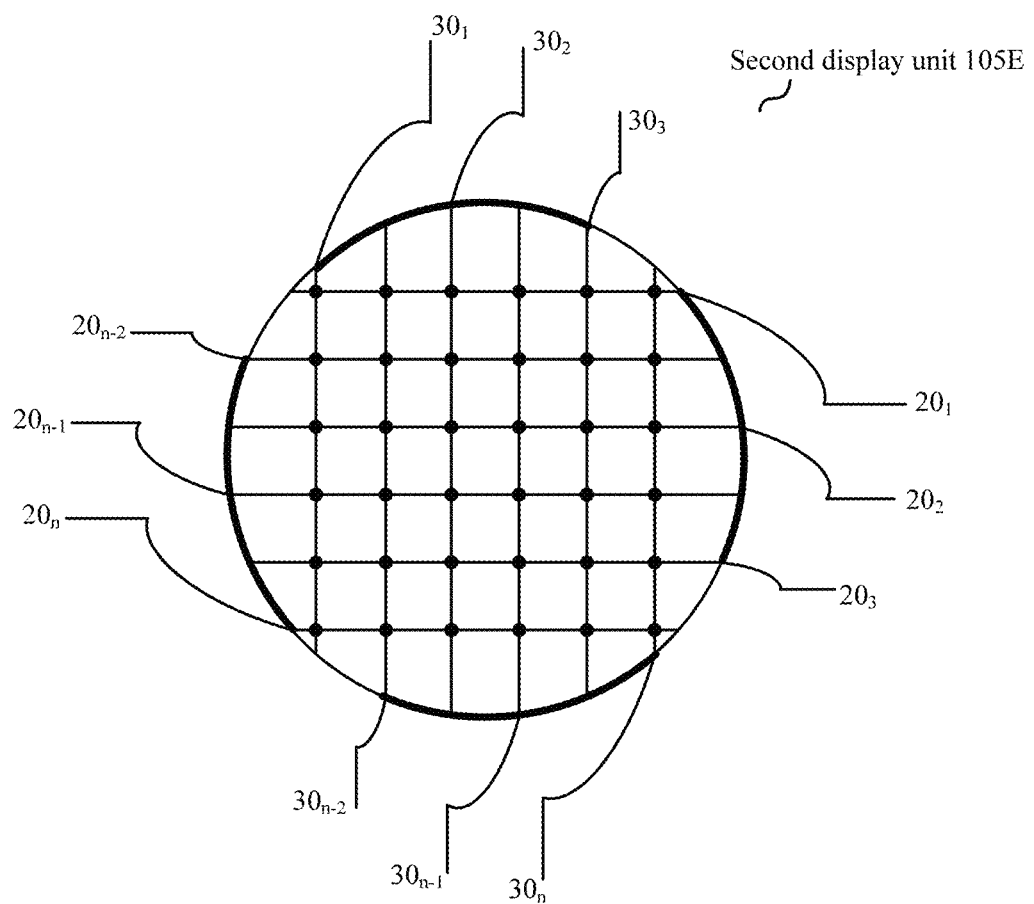

FIGS. 14A to 14B are schematic diagrams illustrating a third example of the second display unit according to an embodiment of the present application. In the second display units 105D and 105E according to the embodiment of the present application, each group into which the plurality of first drive lines and the plurality of second drive lines are divided may include only adjacent drive lines, or each group into which the plurality of first drive lines and the plurality of second drive lines are divided may include drive lines that are not adjacent. Specifically, as shown in FIG. 14A, in the second display unit 105D according to the embodiment of the present application, each group into which the plurality of first drive lines and the plurality of second drive lines are divided may include only adjacent drive lines (e.g., the group composed by adjacent $20_1$, $20_2$, $20_3$; $20_{n-2}$, $20_{n-1}$, $20_n$; $30_1$, $30_2$, $30_3$; $30_{n-2}$, $30_{n-1}$, $30_n$). In contrast, as shown in FIG. 14B, in the second display unit 105E according to the embodiment of the present application, each group into which the plurality of first drive lines and the plurality of second drive lines are divided may include drive lines that are not adjacent (e.g., the group composed by $20_1$, $20_3$, $20_5$; $20_{n-4}$, $20_{n-2}$, $20_n$; $30_1$, $30_3$, $30_5$; and $30_{n-4}$, $30_{n-2}$, $30_n$ that are not adjacent). As can be seen from FIGS. 14A and 14B, adopting such grouped wiring manner, the grouping manner of the plurality of first drive lines and the plurality of second drive lines is not limited to grouping the adjacent drive lines, instead it is possible to select the drive lines that are not adjacent to group as needed by design and display requirements, thus avoiding selecting the narrow frame portion of the display device to perform wiring of the drive lines.

Figure 15:
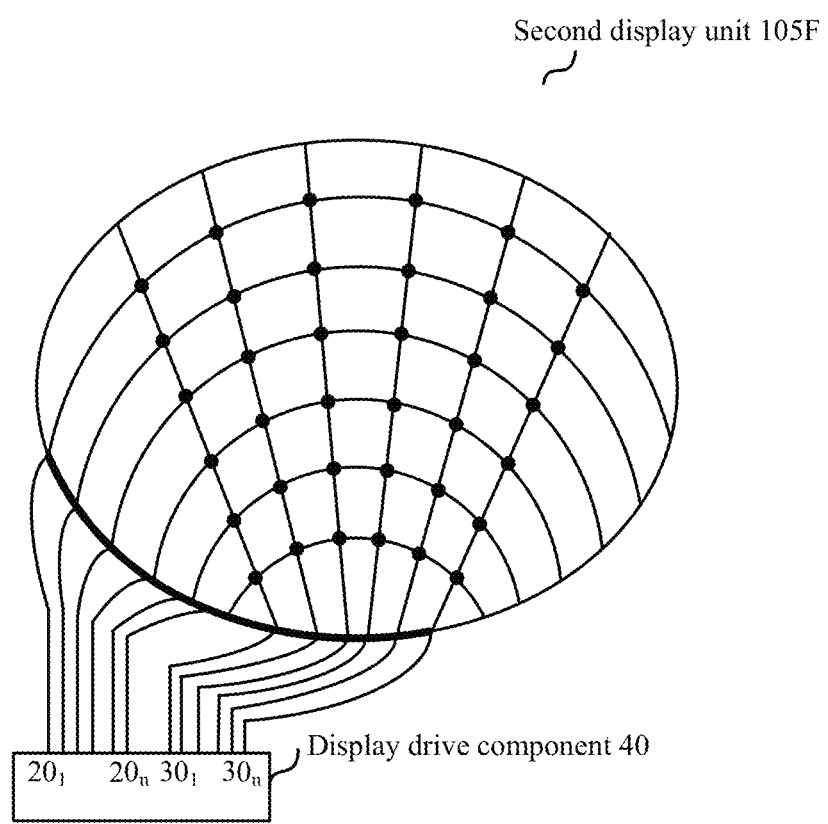
FIG. 15 is a schematic diagram illustrating a fourth example of the second display unit according to an embodiment of the present application.

FIG. 15 is a schematic diagram illustrating a fourth example of the second display unit according to an embodiment of the present application. In the second display unit 105F according to the embodiment of the present application, at least one type of the plurality of first type of drive lines and the plurality of second type of drive lines includes at least one drive line that is a curve. As shown in FIG. 15, each ($20_1$ . . . $20_n$) of the plurality of first type of drive lines 20 is a curve, and each ($30_1$ . . . $30_n$) of the plurality of second type of drive lines 30 is a straight line. As can be readily appreciated, the number of the drive lines and the wiring manner as shown in FIG. 15 are merely illustrative, the second display unit according to an embodiment of the present application is not limited thereto. In another preferred embodiment of the present application, it is allowed that the plurality of second type of drive lines ($30_1 \ldots 30_n$) are a curve, or alternatively, each or more drive lines among the plurality of first type of drive lines ($20_1 \ldots 20_n$) and the plurality of second type of drive lines ($30_1 \ldots 30_n$) are a curve.

As shown in FIG. 15, edge of a visible area of the second display unit 105F is divided into two portions, edge of the visible area to which the plurality of first type of drive lines and the plurality of second type of drive lines connected with the display drive component 40 correspond is located in a first portion of the two portions, that is, the edge portion shown with a bolded line in FIG. 15, whereas edge of the visible area where the plurality of first type of drive lines and the plurality of second type of drive lines connected with the display drive component 40 are not arranged is the second portion. In the embodiment shown in FIG. 15, the first portion and the second portion have two intersection points, that is, the first portion and the second portion are two separate continuous edge areas, respectively, only intersect at their respective endpoints. As can be readily appreciated, coverage of the present application is not limited thereto, the first portion and the second portion may be divided into a plurality of sub-portions, respectively, the plurality of sub-portions of the first portion and the second portion may be alternately distributed as shown below with reference to FIGS. 12A to 14B. Since the plurality of first type of drive lines ($20_1 \ldots 20_n$) are a curve, so that edge of the first portion may tend to cluster. That is, an edge length of the visible area corresponding to the first portion is less than 50% of a total edge length of the visible area. For example, in the example shown in FIG. 2, an edge length of the visible area corresponding to the first portion where drive lines are provided is ⅓ of a total edge length of the visible area. Thus, the second display unit 105F can be provided with a larger edge area that needs no drive line wiring, which thereby facilitates further narrowing the frame of the second display unit 105F. That is, in an electronic device where the second display unit 105F according to an embodiment of the present application is configured, the second display unit 105F may adapt to the shape of the electronic device as needed. Specifically, by adopting the configuration that at least one type of the plurality of first type of drive lines and the plurality of second type of drive lines includes at least one drive line that is a curve, it is possible to bent the drive lines towards the edge of the second display unit that adapts to wiring based on the shape of the electronic device, and select not to configure wiring at the edge having no wiring space of the second display unit based on the shape of the electronic device. Herein, the edge having no wiring space of the second display unit may be an edge where the edge of the second display unit substantially overlaps with the outer frame of the electronic device per se. Alternatively, the edge having no wiring space of the second display unit may be an edge of the electronic device where the outer frame thereof is of an irregular shape and thus is inconvenient for wiring.

In addition, as shown in FIG. 15, curve shape of the drive lines conforms to shape of the edge of the second display unit. In the second display unit 105F as shown in FIG. 15, shape of the edge of the second display unit 105F is an ellipse. As can be readily appreciated, depending on application requirements, the shape of the edge of the second display unit according to an embodiment of the present invention is not limited to ellipse, instead it may be a variety of regular shapes like circle or irregular shapes. The shape of the drive lines being a curve can implement better conforming to the edge of the second display unit, which is a variety of regular or irregular shapes.

Specifically, the plurality of first type of drive lines ($20_1 \ldots 20_n$) which are curves have the same curvature as the corresponding edge of the second display unit 105F. In particular, in the example shown in FIG. 15, the plurality of first type of drive lines ($20_1 \ldots 20_n$) and part of the edge of the second display unit 105F form a curve group having the same circle center and radial outward to the outer center layer by layer, wherein part of the edge of the second display unit 105F is the outermost edge of the concentric nested curve group. Then the plurality of second type of drive lines ($30_1 \ldots 30_n$) may approximately be a plurality of straight lines radiated radially outward from the circle center. Extension lines of the plurality of second type of drive lines ($30_1 \ldots 30_n$) will intersect at the circle center. Further, the plurality of second type of drive lines ($30_1 \ldots 30_n$) may be divided into two groups symmetrical with respect to a center cross-section of the second display unit 105F, for example, drive lines $30_1$, $30_2$, $30_3$, and drive lines $30_{n-2}$, $30_{n-1}$, $30_n$.

In addition, as shown in FIG. 15, the plurality of first type of drive lines ($20_1 \ldots 20_n$) are projected as a plurality of curves arranged equidistantly on a plane vertical to a display direction of the array of display cells. In an embodiment of the present application, a surface where the array of display cells resides probably has fluctuation according to the shape of the electronic device to which it is applied. For example, when the second display unit is applied to a dial of a smart watch which is a convex surface, the surface where the array of display cells resides may be a convex surface corresponding to the dial. The direction of the convex outwardly facing the user is the display direction of the array of display cells, the plurality of first type of drive lines ($20_1 \ldots 20_n$) are projected as a plurality of curves arranged equidistantly on a plane vertical to the display direction.

Figure 16:
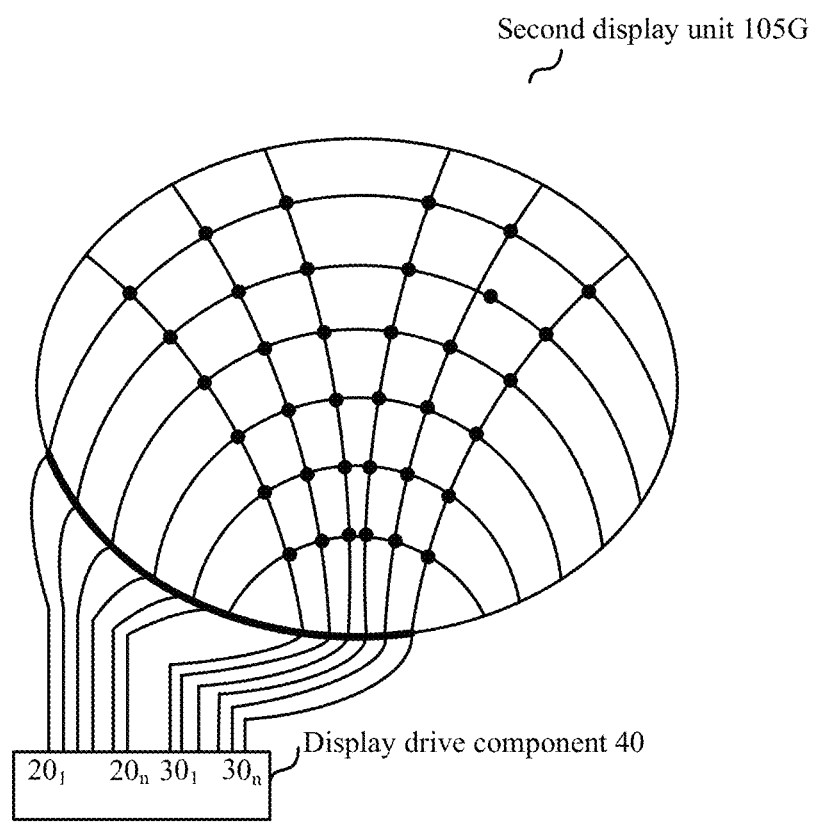
FIG. 16 is a schematic diagram illustrating a fifth example of the second display unit according to an embodiment of the present application.

FIG. 16 is a schematic diagram illustrating a fifth example of the second display unit according to an embodiment of the present application. In the second display unit 105G according to a second embodiment of the present application, each ($20_1 \ldots 20_n$) of the plurality of first type of drive lines 20 and each of ($30_1 \ldots 30_n$) the plurality of second type of drive lines 30 is a curve. Specifically, similar to what is shown in FIG. 2, the plurality of first type of drive lines ($20_1 \ldots 20_n$) and part of the edge of the second display unit 105G form a curve group having the same circle center and radial outward to the outer center layer by layer, wherein part of the edge of the second display unit 105G is the outermost edge of the concentric nested curve group. The plurality of second type of drive lines ($30_1 \ldots 30_n$) are approximately divided into two groups symmetrical with respect to a center cross-section of the second display unit 105G, for example, drive lines $30_1$, $30_2$, $30_3$, and drive lines $30_{n-2}$, $30_{n-1}$, $30_n$, wherein each group of drive lines ($30_1$, $30_2$, $30_3$) or ($30_{n-2}$, $30_{n-1}$, $30_n$) are a portion of a group of inscribed circles that are nested mutually and have a common tangent point.

Accordingly, as compared with the second display unit 105F according to the embodiment of the present application as shown in FIG. 15, by configuring all the plurality of first type of drive lines 20 and the plurality of second type of drive lines 30 as curves, it is possible to further reduce an edge length of the visible area corresponding to the first portion where the drive lines are provided. For example, in the example shown in FIG. 16, an edge length of the visible area corresponding to the first portion where the drive lines are provided is ¼ of a total edge length of the visible area.

Figure 17:
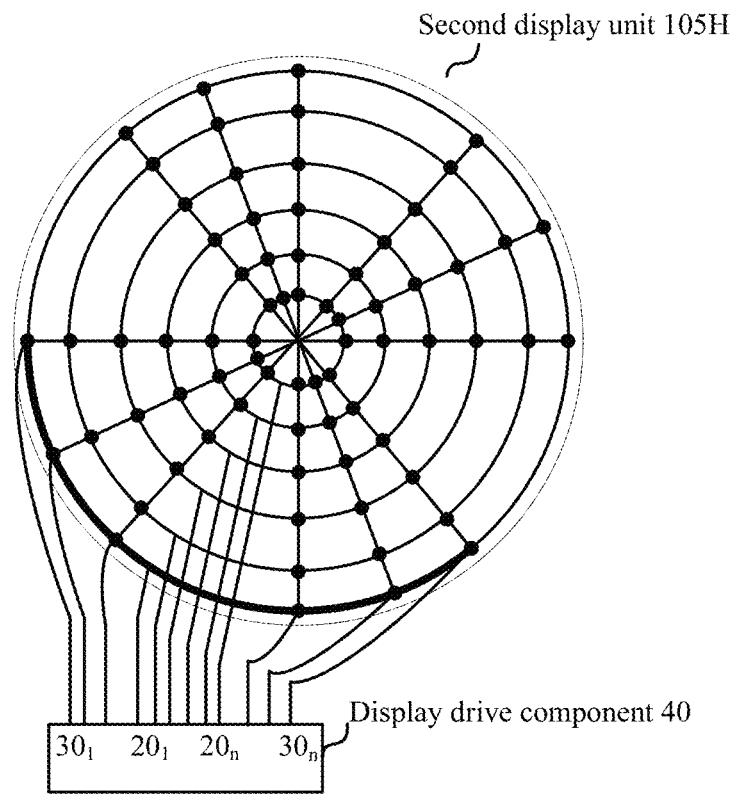
FIG. 17 is a schematic diagram illustrating a sixth example of the second display unit according to an embodiment of the present application.

FIG. 17 is a schematic diagram illustrating a sixth example of the second display unit according to an embodiment of the present application. In the second display unit 105H according to the embodiment of the present application, each ($20_1 \ldots 20_n$) of the plurality of first type of drive lines 20 forms a circle, and each of ($30_1 \ldots 30_n$) the plurality of second type of drive lines 30 is a straight line. Specifically, in the example shown in FIG. 17, the plurality of first type of drive lines ($20_1 \ldots 20_n$) are a group of concentric circles nested concentrically with the edge of the second display unit 105H, wherein the edge of the second display unit 105H is the outermost edge of the group of concentric circles. Then the plurality of second type of drive lines ($30_1 \ldots 30_n$) may approximately be a plurality of straight lines radiated outward from the common circle center of the concentric circles, the plurality of straight lines are the plurality of straight lines of the outermost circle. Accordingly, as compared with the second display unit 105F as shown in FIG. 15 and the second display unit 105G as shown in FIG. 16, by configuring all the plurality of first type of drive lines 20 as circle, it is possible to make the wiring of the drive lines perfectly adapt to the circular outer frame of the display device.

Figure 18:
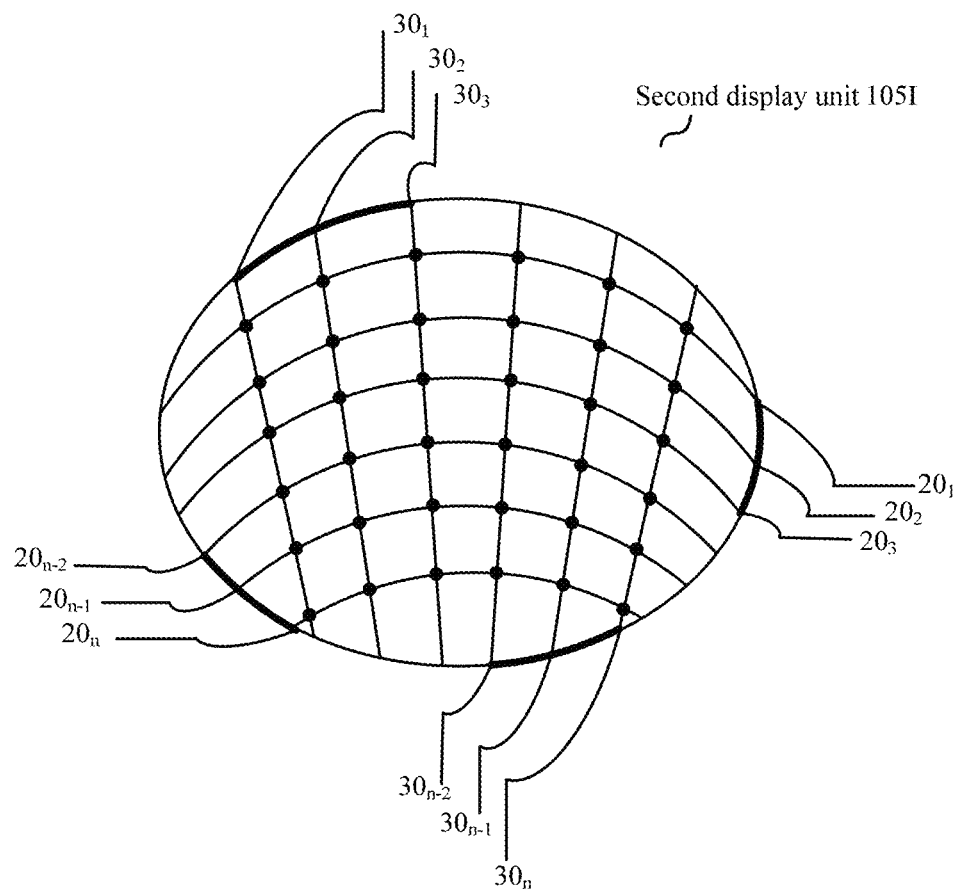
FIG. 18 is a schematic diagram illustrating a seventh example of the second display unit according to an embodiment of the present application.

FIG. 18 is a schematic diagram illustrating a seventh example of the second display unit according to an embodiment of the present application. In the second display unit 105I according to the embodiment of the present application, at least one drive line in at least one group among a plurality of groups of drive lines into which the plurality of first drive lines and the plurality of second drive lines are divided is a curve. Specifically, as shown in FIG. 18, the drive lines $20_1, 20_2, 20_3, 20_{n-2}, 20_{n-1}, 20_n$ are curves. In addition, the plurality of first drive lines and the plurality of second drive lines are divided into a plurality of groups of drive lines (four groups as shown in FIG. 18). As can be seen from FIG. 18, adopting such manner of combination of curve configuration and grouping configuration of the drive lines can make the wiring region of the edge of the display device more tend to cluster, facilitate further narrowing the frame of the display device, and meanwhile make the wiring of the drive lines more flexibly adapt to the outer frame of the display device, as compared with the cases of simply adopting the curve configuration (as shown in FIGS. 21 to 23) and those of simply adopting the grouping configuration (as shown in FIGS. 12 to 14B).

Figure 19A:
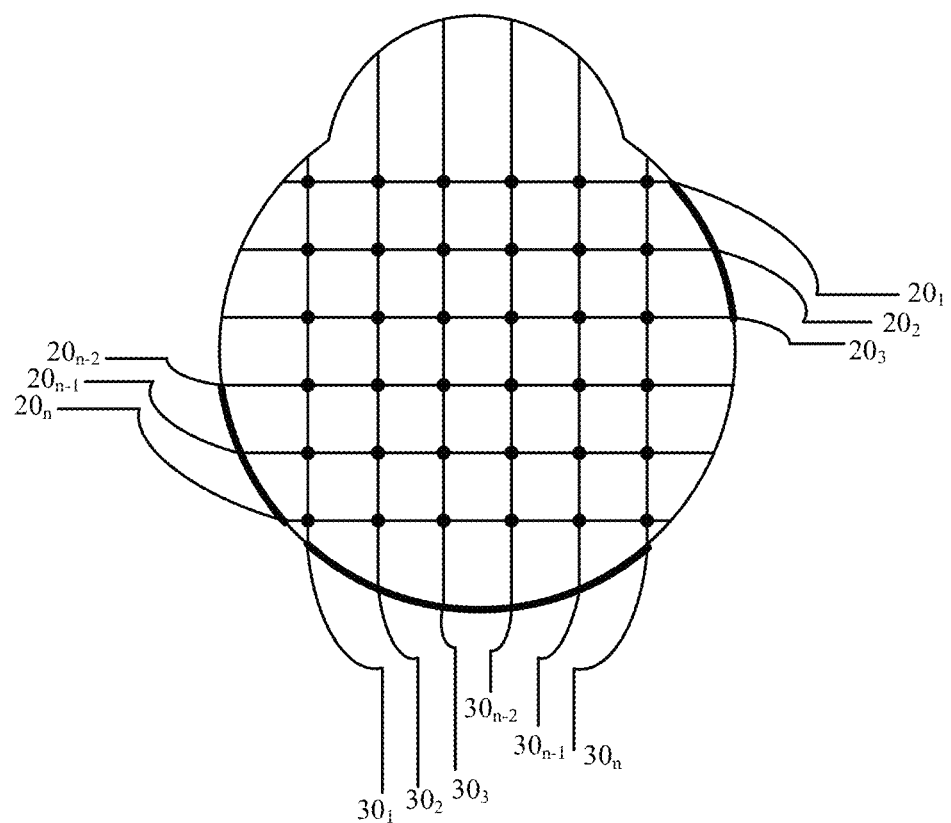
FIGS. 19A to 19B are schematic diagrams illustrating an eighth example of the second display unit according to an embodiment of the present application.
Figure 19B:
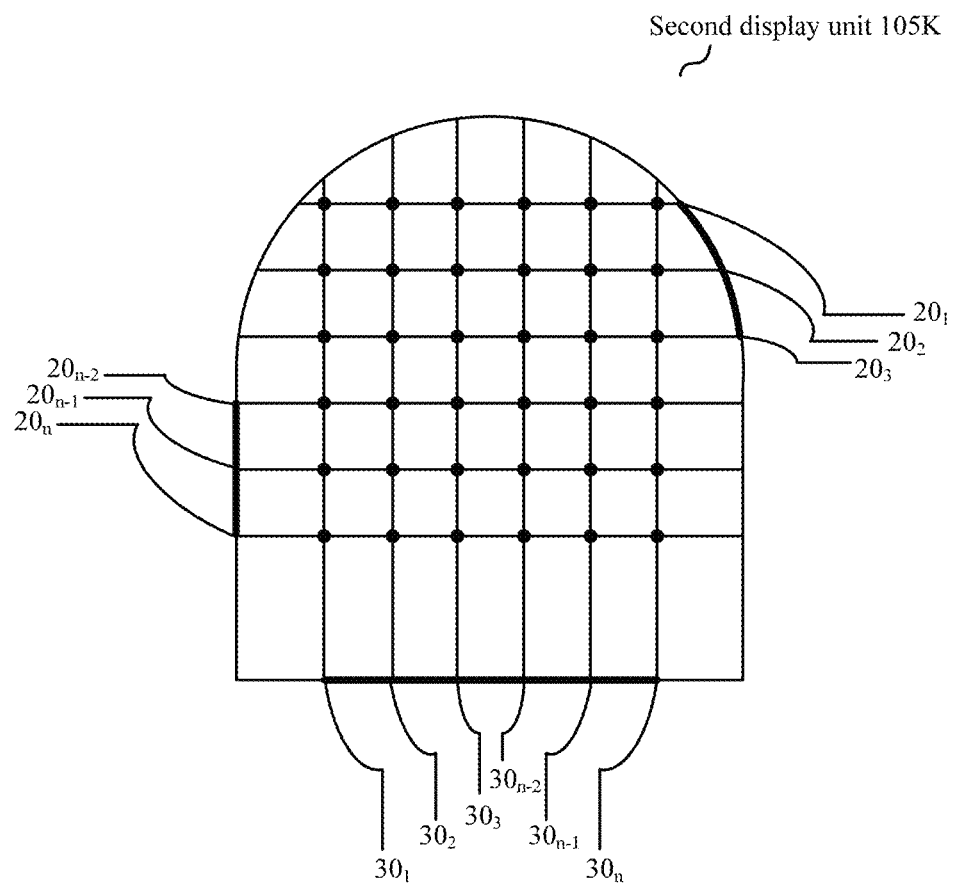

FIGS. 19A to 19B are schematic diagrams illustrating an eighth example of the second display unit according to an embodiment of the present application. In the second display units 105J and 105K according to the eighth embodiment of the present application, at least part of the edge of the surface where the array of display cells 40 residues is a curve, and the edge is at least divided into a first edge portion and a second edge portion, the first edge portion and the second edge portion have different curvatures. Specifically, as shown in FIG. 13A, the edge is divided into an upper first curve edge portion and a lower second curve edge portion, the two portions have different curvatures. Likewise, as shown in FIG. 13B, the edge is divided into an upper first curve edge portion and a lower second straight line edge portion, the two portions obviously have different curvatures. As can be seen from FIGS. 19A and 19B, adopting such wiring manner, the wiring of the plurality of drive lines is not provided in the first edge portion that needs to implement containing the narrow frame of the second display unit correspondingly, the corresponding drive lines, $30_1, 30_2, 30_3, 30_{n-2}, 30_{n-1}, 30_n$ are provided in group in the second edge portion that does not need to implement the narrow frame, so that the wiring can easily adapt to the frame shape according to different requirements. More specifically, for example, when the second display unit as shown in FIGS. 19A and 19B is applied to an electronic device like a smart watch, an edge where the dial of the smart watch is connected with the strap is the second edge portion that does not need to implement the narrow frame, the edge where the dial of the smart watch is not connected with the strap is the first edge portion. In the example shown in FIGS. 19A and 19B, one of the upper edge portion and the lower edge portion is selected as the portion to arrange the wiring group. As can be readily appreciated, the present application is not limited thereto, it is possible to select one of the left edge portion and the right edge portion as the portion to arrange the wiring group.

In the above, an electronic device and the display method according to the embodiments of the present application are described with reference to FIGS. 1 to 19B. The electronic device and the display method according to the embodiments of the present application can avoid a leak of the displayed privacy of the user while providing the user with image or video display with a larger size and a higher resolution, thus enhancing associated user experience.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:
1. An electronic device, comprising:
   a first display unit configured to output a first image, the first display unit comprising:
      a first visible area for allowing first light corresponding to the first image exiting therefrom; and,
      a first viewing area having a minimum area value at a first distance away from the first visible area, wherein the minimum area value is a first threshold for perceiving a complete display content of the first image,
   a second display unit configured to output a second image, the second display unit comprising:
      a second visible area for allowing second light corresponding to the second image exiting therefrom; and
      a second viewing area, from which the second visible area is viewed, for perceiving, a complete display, content of the second image;
   wherein the first display unit and the second display unit operate on different display principles,
   wherein the first visible area is controlled to be less than a second threshold corresponding to the first threshold of the first viewing area, so that the first viewing area satisfies the first threshold in a state where the first viewing area is away from the first visible area by the first distance, and the first light corresponding to the first image cannot exit to outside a scope of the first viewing area, or at least a part of the first light corresponding to the first image exit to outside the scope of the first viewing area, and
   a first area value of the first viewing area is less than a second area value of the second viewing area in a state where the first viewing area and the second viewing area are at an identical distance from the first visible area and the second visible area,
   wherein the second display unit comprises:
      an array of display cells, comprising a plurality of display subunits;
      a plurality of first type of drive lines and a plurality of second type of drive lines, each the plurality of first type drive lines intersection with each of the plurality of second type of drive lines, intersection thereof corresponding to each of the plurality of display subunits, to provide a corresponding display drive signal for each of the plurality if display subunits;
      a display drive unit, connected with the plurality of first type drive lines and the plurality of second type drive lines, to provide a corresponding display drive signal for the plurality of first type of drive lines and the plurality of second type of drive lines;
      wherein at least one drive line of at least one type of drive lines of the plurality of first drive lines and the plurality of second type of drive lines is shaped as a curve,
      an edge of the second visible area of the second display unit is divided into a first portion and a second portion, the edge of the second visible area corresponding to the plurality of first type of drive lines and the plurality of second type of drive lines connected with the display drive unit is located in the first portion, and the first portion is a continuous portion of the edge, and
      wherein an edge length of the second visible area corresponding to the first portion is less than 50% of a total edge length of the second visible area.

2. The electronic device according to claim 1, wherein the first display unit has a visible angle, which is a maximum solid angle between the first light and a normal line of the first visible area, and the first visible area is less than a third threshold and the visible angle is less than a fourth threshold corresponding to the first threshold of the first viewing area.

3. The electronic device according to claim 1, wherein the first display unit further comprises:
   a display component configured to emit the first light; and
   a light path converting component configured to perform light path conversion on the first light to form a magnified virtual image corresponding to the first image.

4. The electronic device according to claim 3, wherein the light path converting component comprises:
   a collimating unit configured to collimate the first light coming from the display component; and,
   a waveguide unit configured to guide the first light coming from the collimating unit into the first viewing area and comprising a plurality of reflection sub-units for guiding the first light coming from the collimating unit into the first viewing, area, wherein the number of the plurality of reflection sub-units is less than a fifth threshold.

5. The electronic device according to claim 1, further comprising a fixing apparatus that includes at least a fixed state in which the fixing apparatus serves as at least a portion of an annular space or an approximate annular space that satisfies a first predetermined condition, the annular space or the approximate annular space surrounds a periphery of a columnar body that satisfies a second predetermined condition.

6. The electronic device according to claim 1, wherein a shape of the first visible area and a shape of the second visible area are different.

7. The electronic device according to claim 1, further comprising:
   a body apparatus that comprises a processing unit configured to generate the first image and execute display control;
   a fixing apparatus connected with the body apparatus and configured to fix a position relationship relative to a viewer of the electronic device;
   wherein the first display unit and the second display unit are provided on the body apparatus and/or the fixing apparatus.

8. The electronic device according to claim 1, wherein each of the plurality of first type of drive lines and the plurality of second type of drive lines is shaped as a curve, and a curvature of the curve is the same as that of the edge so that a shape of the curve is the same as matches a shape of the edge.

9. The electronic device according to claim 1, wherein at least a portion of the edge is shaped as a curve, and the edge is at least divided into a first edge portion and a second edge portion, the first edge portion and the second edge portion having different curvatures.

* * * * *